United States Patent
Hill

(10) Patent No.: US 9,525,372 B2
(45) Date of Patent: Dec. 20, 2016

(54) METHOD AND SYSTEM FOR DETERMINING THE POSITION OF A SYNCHRONOUS MOTOR'S ROTOR

(71) Applicant: Microchip Technology Incorporated, Chandler, AZ (US)

(72) Inventor: Martin Hill, Dorset (GB)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 75 days.

(21) Appl. No.: 14/183,642

(22) Filed: Feb. 19, 2014

(65) Prior Publication Data

US 2014/0232311 A1 Aug. 21, 2014

Related U.S. Application Data

(60) Provisional application No. 61/766,763, filed on Feb. 20, 2013.

(51) Int. Cl.
*H02P 1/04* (2006.01)
*H02P 6/18* (2016.01)
(Continued)

(52) U.S. Cl.
CPC ............... *H02P 6/186* (2013.01); *H02P 6/185* (2013.01); *H02K 29/12* (2013.01); *H02P 6/22* (2013.01);
(Continued)

(58) Field of Classification Search
CPC ........... H02P 6/185; H02P 6/22; H02P 21/146; H02P 21/0053; H02K 29/12
USPC .................................................. 318/400.33
See application file for complete search history.

(56) References Cited

U.S. PATENT DOCUMENTS 7,460,441 B2  12/2008  Bartling ......................... 368/118
7,764,213 B2   7/2010  Bartling et al. ............... 341/152
(Continued)

FOREIGN PATENT DOCUMENTS

EP  1983644 A2  10/2008  ............... H02P 6/18

OTHER PUBLICATIONS

Padmaraja Yedamale et al. "See what you can do with the CTMU AN 1375" May 11, 2011 (May 11, 2011), Microchip Technology Incorporated, XP055047211.*
(Continued)

*Primary Examiner* — Kawing Chan
*Assistant Examiner* — Bradley Brown
(74) *Attorney, Agent, or Firm* — Slayden Grubert Beard PLLC

(57) ABSTRACT

To establish an initial/resting position of a permanent magnet rotor, all motor stator windings are stimulated (voltage applied thereto) in sequence, the time it takes for current in the stimulated stator winding to rise to a specific current value is measured for each stator winding and these time measurement results processed. From the measured time results rotor position to within 60 degrees is determined and the position sector is known prior to starting/rotating the motor. Once the rotor position is known, the next commutation point in a six step sequence is known before actually starting/rotating the motor. Position measurement winding stimulation may be interleaved with commutation pulses, or the unexcited stator winding may be stimulated between commutation pulses to the other two excited stator, wherein one of the two stator windings remains connected to the power and provides a current return path to the unexcited but stimulated stator winding.

31 Claims, 14 Drawing Sheets

(51) Int. Cl.
　　　H02K 29/12　　(2006.01)
　　　H02P 21/14　　(2016.01)
　　　H02P 21/00　　(2016.01)
　　　H02P 6/22　　　(2006.01)

(52) U.S. Cl.
　　　CPC ......... *H02P 21/0053* (2013.01); *H02P 21/146* (2013.01); *H02P 2203/03* (2013.01)

(56) References Cited

U.S. PATENT DOCUMENTS

| 8,022,714 | B2 | 9/2011 | Bartling | ................. | 324/658 |
| 2004/0113576 | A1* | 6/2004 | Heidrich | ................. | H02P 6/22 318/445 |
| 2009/0108783 | A1* | 4/2009 | Paintz | ................. | H02P 6/185 318/400.33 |
| 2010/0102771 | A1* | 4/2010 | Anderson | ................. | H02P 23/14 318/809 |

OTHER PUBLICATIONS

Yedamale, Padmaraja, "AN885: Brushless DC (BLDC) Motor Fundamentals," Microchip Technology Incorporated, 20 pages, Nov. 11, 2003.

Lepkowski, Jim, "AN894: Motor Control Sensor Feedback Circuits," Microchip Technology Incorporated, 18 pages, Dec. 31, 2003.

Yedamale, Padmaraja, "AN970: Using the PIC18F2431 for Sensorless BLDC Motor Control," Microchip Technology Incorporated, 18 pages, Feb. 7, 2005.

Bohn, Bruce, "AN1250: Microchip CTMU for Capacitive Touch Applications," Microchip Technology Incorporated, 22 pages, Jan. 16, 2009.

Brown, Ward, "AN857: Brushless DC Motor Control Made Easy," Microchip Technology Incorporated, 48 pages, May 12, 2011.

Elliott, Charlie et al., "AN901: Using the dsPIC30F for Sensorless BLDC Control," Microchip Technology Incorporated, 36 pages, Jun. 6, 2011.

Cheles, Mihai, "AN1292: Sensorless Field Oriented Control (FOC) for a Permanent Magnet Synchronous Motor (PMSM) Using a PLL Estimator and Field Weakening (FW)," Microchip Technology Incorporated, 20 pages, Jun. 30, 2011.

Lita, Adrian et al., "AN1160: Sensorless BLDC Control with Back-EMF Filtering Using a Majority Function," Microchip Technology Incorporated, 24 pages, Nov. 29, 2011.

Yedamale, Padmaraja et al., "AN 1375: See What You Can Do with the CTMU," Microchip Technology Incorporated, 12 pages, Feb. 18, 2011.

International Search Report and Written Opinion, Application No. PCT/US2014/017247, 19 pages, Sep. 21, 2015.

* cited by examiner

METHOD AND SYSTEM FOR DETERMINING THE POSITION OF A SYNCHRONOUS MOTOR'S ROTOR

RELATED PATENT APPLICATION

This application claims priority to commonly owned U.S. Provisional Patent Application Ser. No. 61/766,763; filed Feb. 20, 2013; entitled "Method and System for Determining the Position of a Synchronous Motor's Rotor," by Martin Hill, and is hereby incorporated by reference herein for all purposes.

TECHNICAL FIELD

The present disclosure relates to the control of synchronous motors, in particular to a method and system for determining the position of a synchronous motor's rotor.

BACKGROUND

Brushless direct current (BLDC) motors are used in industries such as appliances, automotive, aerospace, consumer, medical, industrial automation equipment and instrumentation. BLDC motors do not use brushes for commutation, instead, electronic commutation is used. BLDC motors have advantages over brushed DC motors and induction motors such as: better speed versus torque characteristics, high dynamic response, high efficiency, long operating life, longer time intervals between service, substantially noiseless operation, and higher speed ranges. A brushless motor is constructed with a permanent magnet rotor and wire wound stator poles. Electrical energy is converted to mechanical energy by the magnetic attractive forces between the permanent magnet rotor and a rotating magnetic field induced in the wound stator poles. More detailed information on BLDC motors, available at www.microchip.com, may be found in Microchip Application Notes: AN857, entitled "Brushless DC Motor. Control Made Easy" (2002); AN885, entitled "Brushless DC (BLDC) Motor Fundamentals" (2003); AN894, entitled "Motor Control Sensor Feedback Circuits" (2003); AN901, entitled "Using the dsPIC30F for Sensorless BLDC Control" (2004); AN970, entitled "Using the PIC18F2431 for Sensorless BLDC Motor Control" (2005); AN1160, entitled "Sensorless BLDC Control with Back-EMF Filtering Using a Majority Function" (2012); and AN1292, entitled "Sensorless Field Oriented Control (FOC) for a Permanent Magnet Synchronous Motor (PMSM) Using a PLL Estimator and Field Weakening (FW)" (2011); all available at www.microchip.com/motorcontrol, and all are hereby incorporated by reference herein for all purposes.

BLDC motor control provides three things: (1) pulse width modulation (PWM) drive voltages to control the motor speed, (2) a mechanism to commutate the stator of the BLDC motor, and (3) a way to estimate or sense the rotor position of the BLDC motor. Motor speed is directly proportional to applied voltage, so varying the PWM duty cycle linearly from 0% to 100% will result in a linear speed control from 0% to 100% of maximum RPM. PWM may be used to provide a variable voltage to the stator windings of the BLDC motor. The effective voltage provided thereto is proportional to the PWM duty cycle. The inductances of the stator windings act as low pass filters to smooth out the PWM pulses to substantially direct current (DC). When properly commutated, the torque-speed characteristics of a BLDC motor are substantially identical to a DC motor. The PWM generated variable voltage controls the speed of the motor and its available torque.

A three-phase BLDC motor completes an electrical cycle, i.e., 360 electrical degrees of rotation, in typically six steps at 60 electrical degrees per step. Synchronously at every 60 electrical degrees, winding phase current switching is updated (commutation). However, one electrical cycle may not correspond to one mechanical revolution (360 mechanical degrees) of the motor rotor. The number of electrical cycles to be repeated to complete one mechanical revolution depends upon the number of rotor pole pairs.

BLDC motors are not self-commutating and therefore are more complicated to control. BLDC motor control requires knowledge of the motor rotor position and a mechanism to commutate the BLDC motor stator windings. For closed-loop speed control of a BLDC motor there are two additional requirements, measurement of rotational speed and a pulse width modulation (PWM) drive signal to control the motor speed and power therefrom.

To produce motor torque in a synchronous motor, e.g., brushless DC (BLDC) motors or permanent magnet synchronous motors (PMSM), the rotor position needs to be determined. This may be done, for example, with Hall Effect sensors to provide absolute rotor position sensing. However, Hall Effect sensors increase the cost and complexity of a BLDC motor or PMSM. Sensorless BLDC or PMSM control eliminates the need for Hall Effect sensors by monitoring the back electromotive force (BEMF) voltages at each phase (A-B-C) of the motor to determine drive commutation. The drive commutation is synchronized with the motor when the BEMF of the un-driven phase crosses one-half of the motor supply voltage in the middle of the commutation period. This is referred to as "zero-crossing" where the BEMF varies above and below the zero-crossing voltage over each electrical cycle. Zero-crossing can only be detected on the un-driven phase when the drive voltage is being applied to the driven phases. So detecting a change of the BEMF on the un-driven phase from less than to greater than one-half of the motor supply voltage may be used during application of the drive voltage to the two driven phases for a three phase BLDC motor or PMSM.

One of the simplest methods of control for a BLDC motor or PMSM is six step (trapezoidal) commutation. Switching (commutation), e.g., using power transistors, energizes the appropriate two stator windings of a three phase BLDC motor or PMSM depending upon the rotor position. The third winding remains disconnected from the power source. During rotation of the rotor currents, two of the stator winding currents are equal in magnitude and the third unconnected stator winding current is zero (for a WYE connected stator windings). Using this method with a three phase BLDC motor or PMSM there are only six different space vector directions, and as the rotor turns, the current through two of the stator windings (WYE connected stator windings) is electrically switched (commutated) every 60 degrees of electrical rotation so that the current space vector is always within the nearest 30 degrees of the quadrature direction. The current waveform for each winding is therefore a staircase from zero, to positive current, to zero, and then to negative current. This produces a current space vector that approximates smooth rotation as it steps among six distinct directions as the rotor turns. The trapezoidal-current driven BLDC motor or PMSM are popular because of the simplicity of control but suffer from higher torque ripple and lower efficiency than sinusoidal drive.

Sinusoidal commutation drives the three stator windings of the BLDC motor or PMSM with three currents that vary smoothly as the rotor turns. The relative phases of these currents are chosen, e.g., 120 degrees apart, so that they provide for a smoothly rotating current space vector that is always in the quadrature direction with respect to the rotor and has constant magnitude. This eliminates the torque ripple and commutation spikes associated with trapezoidal commutation. However, sinusoidal commutation drive systems are typically more complex and expensive than trapezoidal commutation drive systems.

Such sensor-less determining applications are reliant on back electro-magnetic force (EMF) sensing or estimation generated by the motor. Thus EMF is proportional to speed and the signal degrades as rotational speed is reduced, so ultimately there is a speed whereby the position of the rotor cannot be detected. This limits the low speed performance and prevents the motor from being optimally commutated from rest. Other methods such as a high frequency injection use impedance/inductance variations, respectively, in a synchronous motor to determine the rotor position. Hence there exists a need for an improved rotor position detection method and system for synchronous motors.

SUMMARY

Therefore, a need exists for determining BLDC motor or PMSM rotor position without having to use position sensors, e.g., Hall Effect sensors, during low rotational speeds or when at rest (no rotation).

According to an embodiment, a method for determining a rotor position in a synchronous three phase motor may comprise the steps of: coupling combinations of two of three stator windings to a first voltage; coupling third ones of the three stator windings to a second voltage; measuring first times for currents through all combinations of the three stator windings to equal a reference current; and determining a rotor position from the measured first times.

According to a further embodiment of the method, may also comprise the steps of: coupling combinations of the two of the three stator windings to the second voltage; coupling the third ones of the three stator windings to the first voltage; measuring second times for currents through all combinations of the three stator windings to equal the reference current; and determining the rotor position from the measured first and second times. According to a further embodiment of the method, the measured first and second times for each of the third ones of the three stator windings may be phase time measurement pairs. According to a further embodiment of the method, the phase time measurement pair having a largest absolute value of a difference between the first and second times of the phase time measurement pair and a sign thereof represents the rotor position. According to a further embodiment of the method, the rotor position may be within an electrical sector associated with the phase time measurement pair having the largest absolute value of a difference therebetween. According to a further embodiment of the method, the electrical sector comprises 60 electrical degrees and may be one of six electrical sectors comprising 360 electrical degrees.

According to a further embodiment of the method, the three stator windings may be represented by phase A, phase B and phase C; the measured first time for phase A stator winding may be Ta+; the measured second time for phase A stator winding may be Ta−; the measured first time for phase B stator winding may be Tb+; the measured second time for phase B stator winding may be Tb−; the measured first time for phase C stator winding may be Tc+; the measured second time for phase c stator winding may be Tc−; and the electrical sector may be determined by

| phase | Sector 1 | Sector 2 | Sector 3 | Sector 4 | Sector 5 | Sector 6 |
|---|---|---|---|---|---|---|
| A | Ta+ > Ta− | Ta+ > Ta− | Ta+ < Ta− | Ta+ < Ta− | Ta+ < Ta− | Ta+ > Ta− |
| B | Tb+ < Tb− | Tb+ > Tb− | Tb+ > Tb− | Tb+ > Tb− | Tb+ < Tb− | Tb+ < Tb− |
| C | Tc+ < Tc− | Tc+ < Tc− | Tc+ < Tc− | Tc+ > Tc− | Tc+ > Tc− | Tc+ > Tc− |

According to a further embodiment of the method, the second voltage may be more positive than the first voltage. According to a further embodiment of the method, the first voltage may be more positive than the second voltage. According to a further embodiment of the method, the currents may be converted to voltages and the measured first and second times may be when the converted voltages may be equal to a reference voltage. According to a further embodiment of the method, the first and second times may be measured with a charge time measurement unit (CTMU). According to a further embodiment of the method, the CTMU generates timing voltages proportional to the measured first and second times. According to a further embodiment of the method, the CTMU generated timing voltages proportional to the first and second measured times may be converted to digital representations thereof with an analog-to-digital converter (ADC). According to a further embodiment of the method, the digital representations proportional to the first and second measured times may be processed in a digital processor for determining the rotor position. According to a further embodiment of the method, the CTMU, ADC and digital processor may be provided in a microcontroller According to a further embodiment of the method, the synchronous three phase motor may be a brushless direct current (BLDC) motor.

According to a further embodiment of the method, the synchronous three phase motor may be a permanent magnet synchronous motor (PMSM). According to a further embodiment of the method, the first and second times may be measured when power pulses are not being coupled to the stator windings. According to a further embodiment of the method, the measured first times may be shorter than times that the third ones of the three stator windings may be coupled to the second voltage. According to a further embodiment of the method, the measured second times may be shorter than times that the third ones of the three stator windings may be coupled to the first voltage.

According to another embodiment, a method for determining a rotor position in a synchronous multi-phase motor may comprise the steps of: coupling combinations of all but one of a plurality of stator windings to a first voltage; coupling remaining ones of the plurality stator windings to a second voltage; measuring first times for currents through all combinations of the plurality stator windings to equal a reference current; and determining a rotor position from the measured first times.

According to a further embodiment of the method, may also comprise the steps of: coupling combinations of the all but one of the plurality of stator windings to the second voltage; coupling the remaining ones of the plurality stator windings to the first voltage; measuring second times for currents through all combinations of the plurality stator windings to equal the reference current; and determining the rotor position from the measured first and second times. According to a further embodiment of the method, the measured first and second times for each of the remaining ones of the plurality stator windings may be phase time measurement pairs. According to a further embodiment of the method, the phase time measurement pair having a largest absolute value of a difference between the measured first and second times of the phase time measurement pair and a sign thereof represents the rotor position. According to a further embodiment of the method, the rotor position may be within an electrical sector associated with the phase time measurement pair having the largest absolute value of a difference therebetween.

According to yet another embodiment, a method for determining a rotor position in a synchronous three phase motor may comprise the steps of: coupling first ones of three stator windings to a first voltage; coupling second ones of the three stator windings to a second voltage; injecting first currents from the first voltage into third ones of the three stator windings when the first ones of three stator windings are not coupled to the first voltage and the second ones of the three stator windings remain coupled to the second voltage; measuring first times for the first currents to equal a reference current; and determining a rotor position from the measured first times.

According to a further embodiment of the method, may also comprise the steps of: injecting second currents from the second voltage into the third ones of the three stator windings when the second ones of three stator windings are not coupled to the second voltage and the first ones of the three stator windings remain coupled to the first voltage; measuring second times for the second currents to equal the reference current; and determining the rotor position from the measured first and second times. According to a further embodiment of the method, the first times for each of the third ones of the three stator windings may be measured in alternate states. According to a further embodiment of the method, the alternate states may be states (60), (180) and (300). According to a further embodiment of the method, the second times for each of the third ones of the three stator windings may be measured in other alternate states. According to a further embodiment of the method, the other alternate states may be states (120), (240) and (360). According to a further embodiment of the method, the first currents may be converted to first voltages and the measured first times may be when the converted first voltages may be equal to a reference voltage. According to a further embodiment of the method, the first and second currents may be converted to first and second voltages and the measured first and second times may be when the converted first and second voltages may be equal to a reference voltage.

According to a further embodiment of the method, the first times may be measured with a charge time measurement unit (CTMU). According to a further embodiment of the method, the first and second times may be measured with a charge time measurement unit (CTMU). According to a further embodiment of the method, the CTMU generates first and second timing voltages proportional to the first and second measured times, respectively. According to a further embodiment of the method, the CTMU generated first and second timing voltages may be converted to digital representations thereof with an analog-to-digital converter (ADC). According to a further embodiment of the method, the digital representations proportional to the measured first and second times may be processed in a digital processor for determining the rotor position.

According to a further embodiment of the method, the first currents injected into the third ones of the three stator windings may be provided by an adjustable current source. According to a further embodiment of the method, the measured first times may be shorter than times that the first currents may be injected into the third ones of the three stator windings. According to a further embodiment of the method, the measured second times may be shorter than times that the second currents may be injected into the third ones of the three stator windings. According to a further embodiment of the method, the second voltage may be more positive than the first voltage. According to a further embodiment of the method, the first voltage may be more positive than the second voltage.

According to still an embodiment, a system for determining a synchronous motor's rotor position may comprise: a microcontroller comprising a digital processor and memory, a charge time measurement unit (CTMU) coupled to the digital processor, a timing capacitor coupled to the CTMU, an analog-to-digital converter (ADC) coupled to the CTMU, an analog comparator coupled to the CTMU, and a voltage reference coupled to a first input of the analog comparator; a synchronous motor driven by a power bridge comprising a plurality of power switches for coupling stator windings of the synchronous motor to a power source; a current return device coupled between some of the power switches and the power source; a second input of the analog comparator coupled to the current return device, wherein the current return device provides a voltage to the second input of the analog comparator proportional to current through the stator windings of the synchronous motor; wherein the digital processor causes the power switches to couple combinations of two of the three stator windings to a first voltage from the power source and third ones of the three stator windings to a second voltage from the power source, and the CTMU to start charging the timing capacitor; the analog comparator compares the voltage from the current return device for each combination of the three stator windings with a reference voltage from the voltage reference, wherein when the voltage from the current return device may be substantially the same as the reference voltage the CTMU stops charging the timing capacitor; and the ADC converts charge voltages on the timing capacitor to digital representations thereof that may be coupled to the digital processor, wherein the digital processor compares these digital representations to determine the rotor position of the synchronous motor. According to a further embodiment, the charge voltages on the timing capacitor may be representative of winding current charging times.

According to another embodiment, a system for determining a synchronous motor's rotor position may comprise: a microcontroller comprising a digital processor and memory, a charge time measurement unit (CTMU) coupled to the digital processor, a timing capacitor coupled to the CTMU, an analog-to-digital converter (ADC) coupled to the CTMU, an analog comparator coupled to the CTMU, and a voltage reference coupled to a first input of the analog comparator; a synchronous motor driven by a power bridge comprising a plurality of power switches for coupling stator windings of the synchronous motor to a power source; a multiplexer having outputs coupled to respective ones of the stator windings, and an input coupled to a current source; a current return device coupled between the current source and the power source; a second input of the analog comparator coupled to the current return device, wherein the current return device provides a voltage to the second input of the analog comparator proportional to current through the current return device; wherein the digital processor causes the power switches to couple first ones of the stator windings to a first voltage from the power source and second ones of the stator windings to a second voltage from the power source, the multiplexer to inject current from the current source into third ones of the stator windings, and the CTMU to start charging the timing capacitor; the analog comparator compares the voltage from the current return device for each combination of the three stator windings with a reference voltage from the voltage reference, wherein when the voltage from the current return device may be substantially the same as the reference voltage the CTMU stops charging the timing capacitor; and the ADC converts charge voltages on the timing capacitor to digital representations thereof that may be coupled to the digital processor, wherein the digital processor compares the digital representations to determine the rotor position of the synchronous motor.

According to a further embodiment, the charge voltages on the timing capacitor may be representative of winding current charging times. According to a further embodiment, the current source may be adjustable. According to a further embodiment, a second multiplexer may be coupled between the current source and the power source for reversing direction of the current injected into the third ones of the stator windings.

BRIEF DESCRIPTION OF THE DRAWINGS

A more complete understanding of the present disclosure may be acquired by referring to the following description taken in conjunction with the accompanying drawings wherein.

Figure 1:
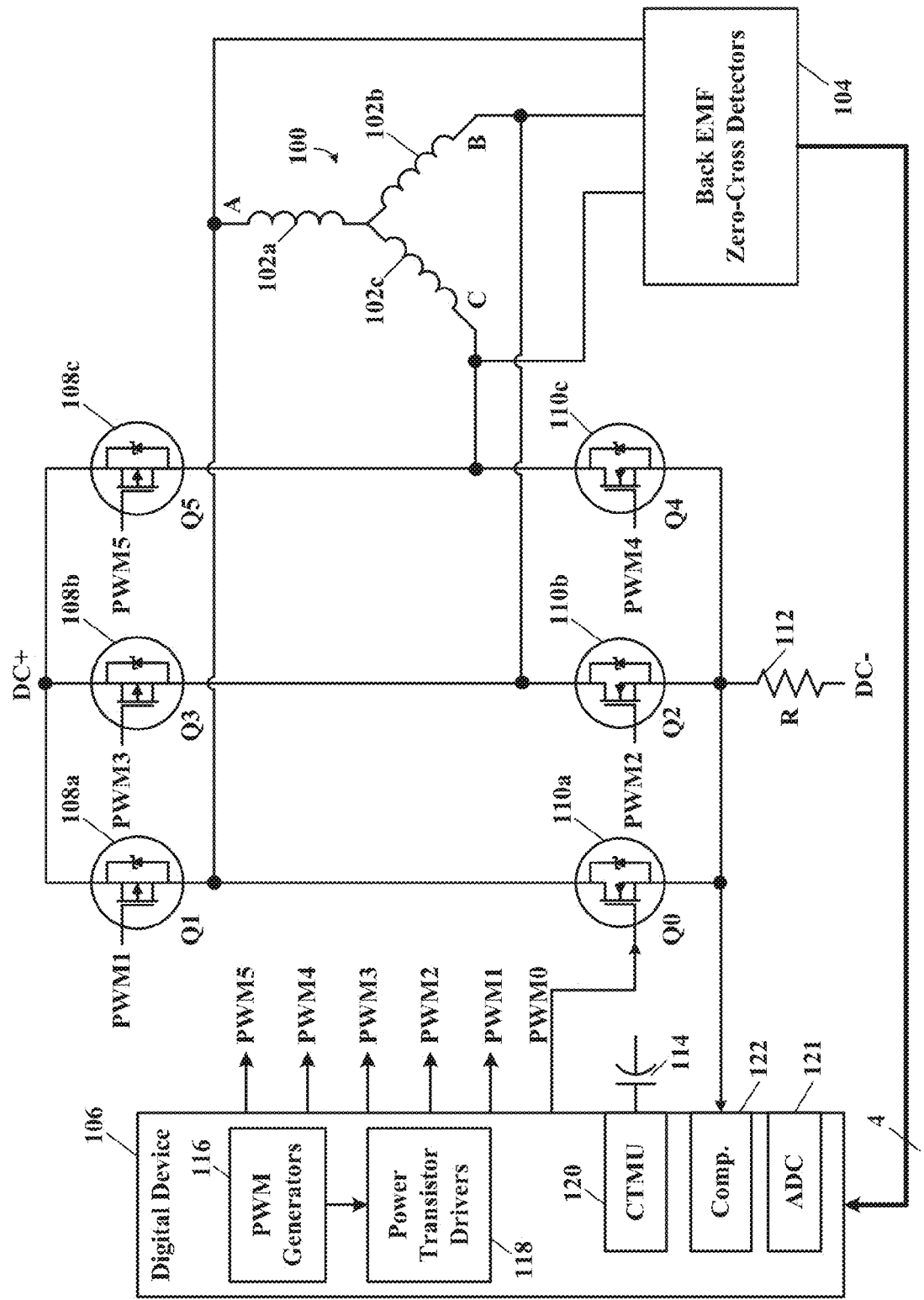
FIG. 1 illustrates a schematic diagram of a three-phase sensorless brushless direct current motor and electronically commutating motor controller, according to the teachings of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

General Overview

All the methods and system variants described herein may be used to replace sensors, e.g., such as Hall Effect based with the specific intention to start and run a BLDC motor or its variants in a commonly referred to sensor-less way. The specific application of low speed starting and operation without sensors is addressed and the limitation of other methods based on back EMF measurement is overcome. This is done by primarily measuring motor stator phase/winding current rise times to determine inductance change as it is affected by rotor position.

A charge time measurement unit (CTMU) subsystem effectively (amplifies) increases the time resolution of the measurements of motor phase current rise times to the comparator reference level. These measurements are linked to the rotor position through corresponding stator winding inductance change relative to rotor magnet orientation. The CTMU modes of operation allow measurements to be sensitized to extremely small changes in inductance. This is done by charging the CTMU capacitor in a narrow time slot when comparatively longer measurement pulses are applied. To do this the CTMU capacitor may be charged in a narrow time slot at a specific point during application of the longer time measurement pulse. This technique effectively compresses the range, e.g., higher resolution, of the ADC into a corresponding time window set accordingly by the rate the CTMU charges the capacitor. Hence when comparing motor phase current rise time measurement samples the difference is amplified and sensitivity may be optimized. This is particularly relevant with motor designs which exhibit low inductance change with rotor position.

The CTMU also enables small measurement pulses to be applied which may be interleaved within commutated motor PWM cycles. Thus a more seamless measurement method may be realized. The theory behind the timing features of the CTMU are more fully described in commonly owned U.S. Pat. No. 7,460,441 B2; entitled "Measuring a Long Time Period" by James E. Battling; U.S. Pat. No. 7,764,213 B2; entitled "Current-Time Digital-to-Analog Converter" by James E. Bartling; U.S. Pat. No. 8,022,714 B2; entitled "Capacitance Measurement Apparatus" by James E. Bartling, et al.; and Microchip Application Note AN1250, entitled "Microchip CTMU for Capacitive Touch Applications" by Bruce Bohn; all of which are hereby incorporated by reference herein for all purposes.

According to a first embodiment, an initial/resting position of a permanent magnet rotor may be established, all motor stator windings may be stimulated in sequence, measuring and processing the results. The intention is to resolve rotor position to within 60 degrees (one electrical sector from six) prior to starting/rotating the motor. Once the rotor position is known, the next commutation state may be determined before actually starting/rotating the motor. So prior to starting the motor the next commutation state in a six step sequence (commonly referred to as six step control) is known. Effectively a datum or absolute position may be determined for commutation purposes. That is advantageous because the motor did not need to be rotated (back EMF methods need to rotate the motor in order to enable a signal measurement and determine position or drive to a fixed position prior to starting). Measurement of the rotor position is also useful when the motor is turned by an external force such as air in a fan duct (some terminology refers to this as wind milling) or in limited or pulsed commutation applications. In this case a finer resolution position measurement is possible and also directional information (CW/CCW). This is done by transforming the three phase time domain measurements into a space vector representation via a Clarke transformation and then performing the arctan trigonometric function on the two quadrature phase transformed signals. The latter are commonly used in FOC (Field Oriented Control) motor control applications along with the Park transformation. However, as the stator field is not producing a rotating field only the Clarke transform and arctan function is required to resolve rotor position. The measurement accuracy will be related to component tolerances, the characteristic variation of inductance with rotor position and it is envisaged that the accuracy could be less than one (1) degree (mechanical) for a given motor. The resolution similarly would be affected by the aforementioned and also the rate of measurement compared with the rotor speed.

According to a second embodiment, a "Measurement and Motor Driving Interleaved" operation may be performed wherein the power bridge is used for both power drive and rotor location measurement purposes but at different times. So following on from the previously described embodiment, the motor may be driven for a short time period to ensure rotation followed by the rotor position measurement. The measurements are made on the rotating motor and so like in the aforementioned first embodiment a finer resolution position measurement is enabled that may be used to more accurately commutate the motor. This method is not ideal as the motor will accelerate and decelerate with this type of interleaved control and measurement. However the measurement time is small compared to the commutation (drive) time and this is where the CTMU assists with its inherent capability to enable fine resolution time measurements in small time slots. For this interleaved sequence the commutation of the motor may be a six (6) step trapezoidal or even sinusoidal/FOC (Field Oriented Control).

According to third and fourth embodiments, a more seamless method where both rotor position measurement and motor driving may proceed in parallel rather than sequentially is described. This would use modified hardware that is specific to the measurement subsystem to decouple the need for independent access to and control of the power bridge. The first and second embodiments described previously require independent access to and control of the power bridge due to the specific measurement sequence employed e.g., the commutation sequence is different from the measurement sequence in relation to driving the direction of currents through the motor windings. However, the third and fourth embodiments consider the six step commutation sequence specifically (six step control method) whereby only two out of the three motor windings are energized at any time instant. That leaves an un-energized phase that may be used for the purpose of inductance change measurement, but to do this requires a different measurement method as used for the first and second embodiments. Making various measurements by turning or spinning the motor by hand (see FIGS. 5, 6 and 7) reveals the characteristic variation in inductance and hence rotor position may be revealed for both the bidirectional and unidirectional currents passed through the motor windings. Therefore, uni-directional current winding stimulations (third embodiment) may be used on the un-energized motor windings for the purpose of rotor position measurement during the commutation sequence. Furthermore, bi-directional current winding stimulations (fourth embodiment) may be used on the un-energized motor windings for the purpose of rotor position measurement during the commutation sequence.

This enables the measurement and commutation sequences to proceed in parallel. Effective signal processing may use the relative phase and time displacement derived from measurements on each un-energized stator winding to determine the next commutation in the six (6) step sequence. The measurement specific hardware may pass a controlled current through the un-energized phase which is much smaller in magnitude to that used for commutating/driving the motor. Alternatively, the hardware may be used to pass un-controlled current for a short amount of time through the un-energized phase. The intention with both is to decouple measurement and commutation and limit the interaction effects therebetween. With this approach the position measurement may be done over a much wider speed range. Due to the CTMU's scalable performance it is possible for the measurement to be done within a portion of a commutation PWM cycle. For this purpose the PWM cycle may also be adjusted for the specific purpose. This would offer the capability to fit the measurement into other commutation schemes besides trapezoidal commutation that commutate all of the motor phases continuously. e.g., sinusoidal commutation, whereby the notion of an un-energized/non-driven phase is not apparent but during the low (OFF) portion of a PWM cycle the measurement may be performed on any one of the phases. This would enable a more universal measurement capability for motor control applications.

Referring now to the drawings, the details of example embodiments are schematically illustrated. Like elements in the drawings will be represented by like numbers, and similar elements will be represented by like numbers with a different lower case letter suffix.

Referring to FIG. 1, depicted is a schematic diagram of a three-phase sensorless brushless direct current motor and electronically commutating motor controller, according to the teachings of this disclosure. A three-phase sensorless brushless direct current motor, generally represented by the numeral 100, may comprise a plurality of stator windings 102 and a rotor (not shown) comprising at least one permanent magnet. For discussion purposes the motor 100 described herein will be a four pole three-phase configuration requiring 360 degrees of electrical rotation to produce half a mechanical revolution of 180 degrees. The three-phase sensorless brushless direct current motor 100 may be electronically commutated with switching power transistors 108 and 110, e.g., power field effect transistors (one pair per phase for a three-phase motor), connected to the stator windings 102 (windings) thereof and a direct current (DC) power source (not shown). Back electromotive force (EMF) zero-cross detectors 104 (shown for illustration but not part of the teachings herein) and a digital device 106, e.g., a microcontroller, may have PWM generators 116 that provide pulse width modulation (PWM) outputs coupled to power transistor drivers 118. The power transistor drivers 118 (PWM0-PWM5) may control turn-on and turn-off of the switching power transistors 108 and 110. For rotor position detection, according to the teachings of this disclosure, the back electromotive force (EMF) zero-cross detectors are not required and are only used for the six step trapezoidal control case. They could equally be replaced with Hall sensors.

The power transistors 108 and 110 may be controlled by the digital device 106 (e.g., a microcontroller) that may be coupled to the power transistors 108 and 110 through power transistor drivers 118 that may or may not be part of the digital device 106. The digital device 106 may provide, via the power transistor drivers 118, six pulse width modulation (PWM) outputs, PWM0-PWM5, that may control both the motor rotation direction and speed by turning on and off appropriate ones of the power transistors 108 and 110, according to PWM signals appropriately sequenced and timed. The digital device 106 may further comprise a voltage comparator 122, analog-to-digital converter 121 and a charge time measurement unit (CTMU) 120, as more fully described hereinafter.

First and Second Embodiments

According to first and second embodiments, the measurement method may be done on a stationary or commutating motor, respectively. For the second embodiment the rotor position measurements are interleaved (do not occur during a commutation period) and hence commutation and measurement may proceed in a sequential manner. In addition, if the motor is rotated by an external force as described herein the rotor position may also be detected before commutation begins (e.g., using the first embodiment).

The method and system of the first and second embodiments may be integrated into a commutation scheme commonly referred to as six step control for BLDC motors, but is not limited to that, other motor variants thereof, e.g., a permanent magnet synchronous motor (PMSM). Prior to starting/commutating the motor the rotor position may be determined (first embodiment) and this may be used to select the switching state (starting point) in the associated six step control sequence. This effectively synchronizes the commutation sequence with the rotor position prior to start up and this has the effect of enabling efficient torque to be delivered to the motor when the commutation sequence starts. This aligns with the synchronous control nature of an electronically controlled brushless motor.

Figure 5:
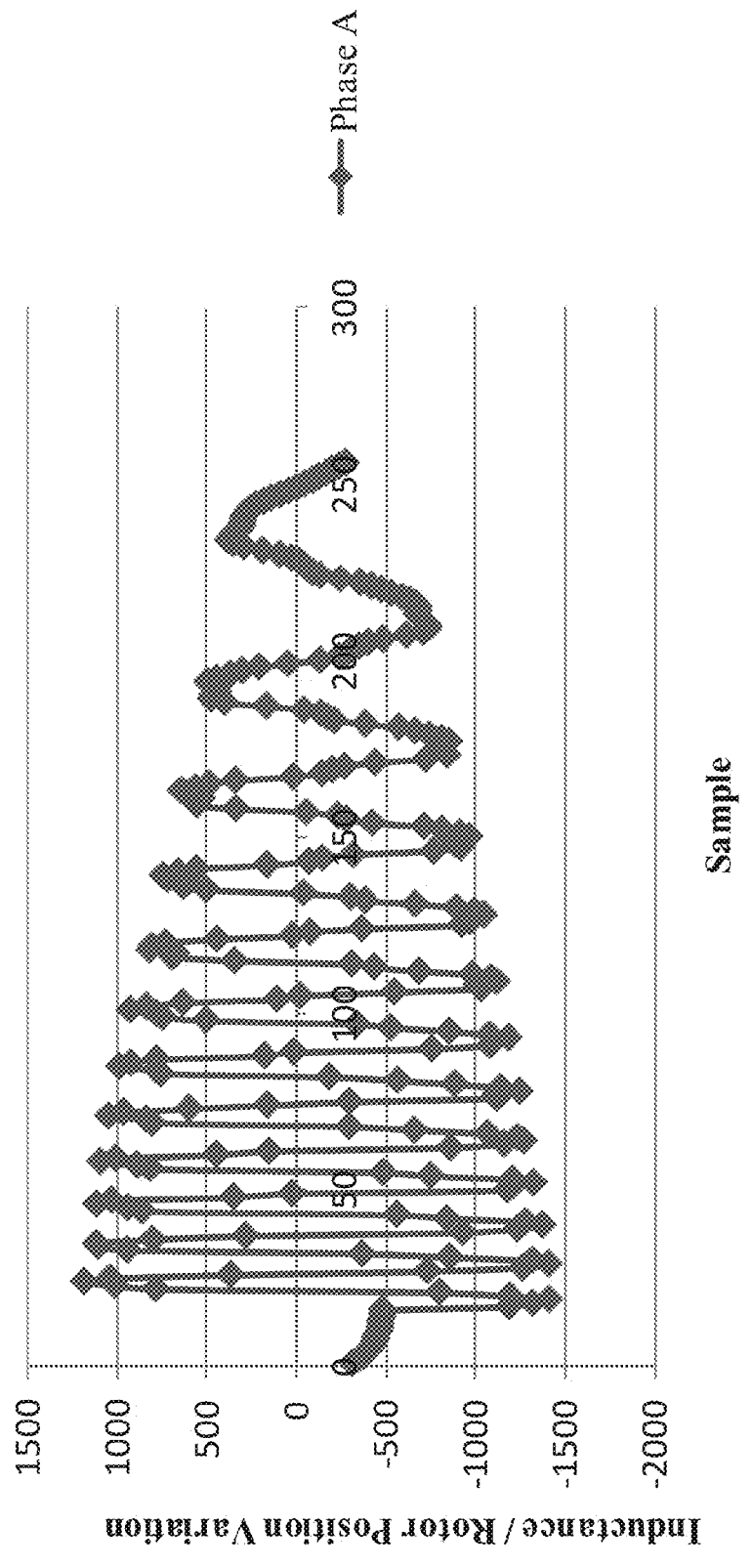
FIG. 5 illustrates a graphical waveform representation of inductance/rotor position variation measured on one phase with bi-directional pulses applied and the motor rotor spun by hand, according to the teachings of this disclosure.
Figure 6:
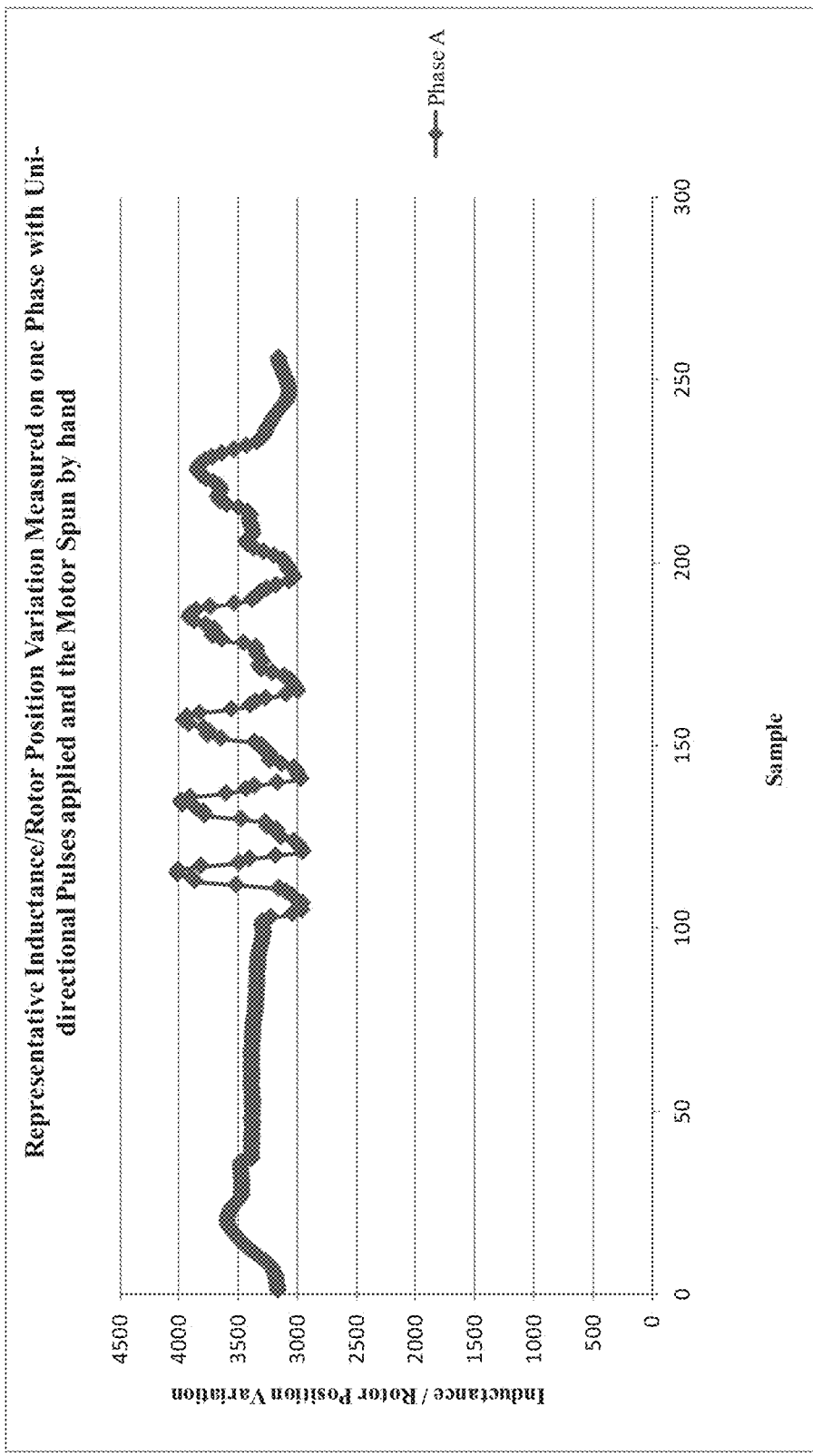
FIG. 6 illustrates a graphical waveform representation of inductance/rotor position variation measured on one phase with uni-directional pulses applied and the motor spun by hand, according to the teachings of this disclosure.
Figure 7:
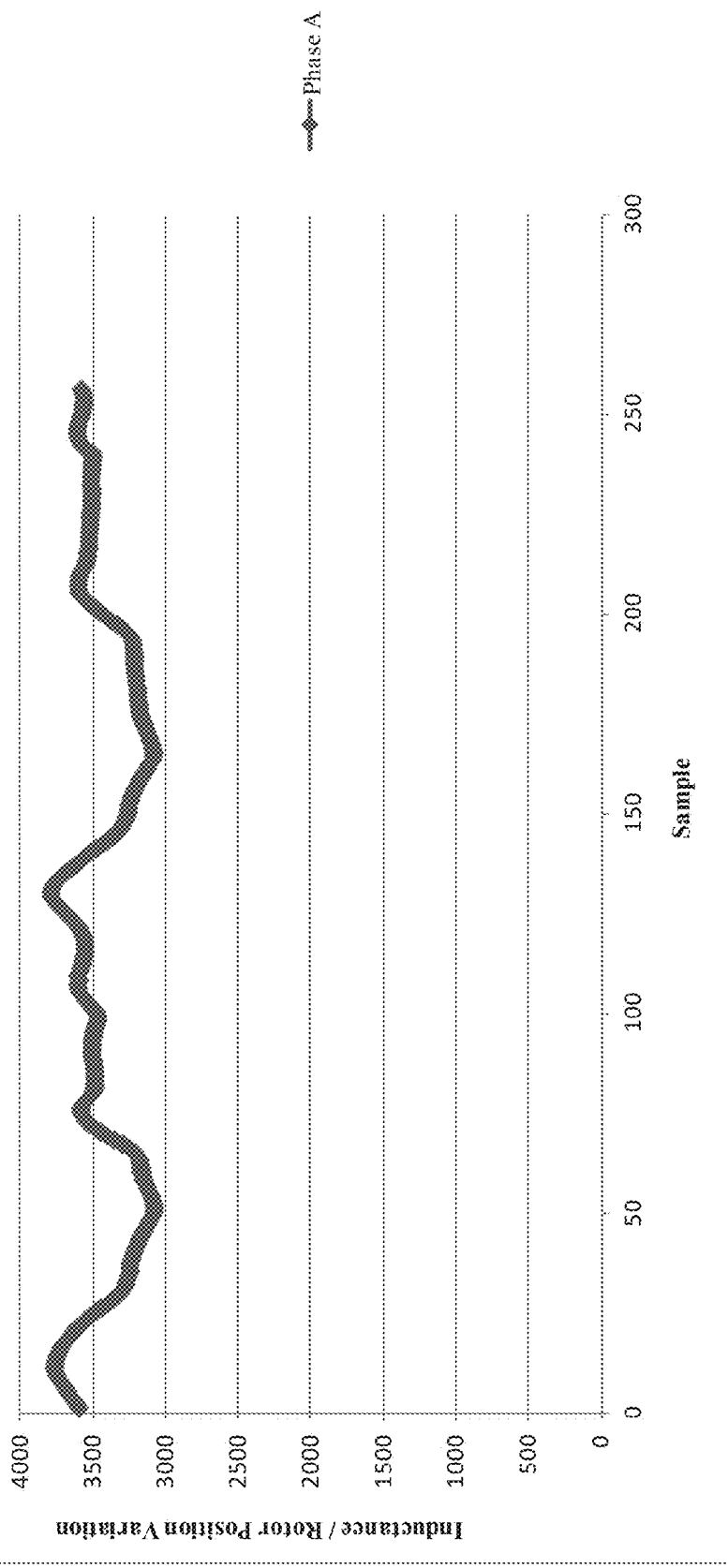
FIG. 7 illustrates a graphical waveform representation of inductance/rotor position variation measured on one phase with uni-directional pulses applied and the motor rotated very slowly by hand, according to the teachings of this disclosure.

Referring to FIGS. 5, 6 and 7, depicted are representative measurements showing inductance change/rotor position that illustrate not only position but signal amplitude with speed and hence may be used for determination of that variable also. Signal processing of the measurements in the form of Clarke transformation and the trigonometric arctan function may be used to determine the rotor position (depending on the specific inductance characteristics) and speed through an effective vector representation of the measured signals. It is envisaged this may enable rotor position measurement to within one (1) mechanical degree in practice. Hence this enables more efficient commutation scheduling and thus more efficient motor operation than provided by Hall sensors which commonly provide signal change indication every 60 electrical degrees. Note that the data used for the graphs shown in FIGS. 5, 6 and 7 were taken with a 12 bit analog-to-digital converter (ADC).

Commutation and measurement of rotor position may proceed in a sequential manner and this affords the motor to be commutated at a less frequent rate (a pulsed type commutation) which may enable low power consumption modes of operation to be realized. E.g., whereby the motor operation is desired to produce rotation at low speed but full torque is not required by the application. It would suit, for example, systems where a large inertial load, like a flywheel, is deployed with low overall friction. Hence, once rotating the load and low friction enable it to keep turning without continuous commutation. With this scenario commutation is used to start and keep the motor rotating and in-between commutations the measurement of speed and position ensues until the next commutation point is scheduled. In this way commutation does not need to be the next in the logical six-step control sequence. Another example is a fan required to run at low speed and therefore reduced torque. This type of operation may also mitigate the effects of having a stationary motor for long time periods whereby stiction and build-up of contaminants in some situations may affect motor reliability. Similarly, knowing the rotor position and speed through these measurements offers the ability to brake the motor rotor at a certain position. Hence this may be coupled for example with a pulsed commutation mode to achieve a position control system. Therefore this type of system may enable replacement of stepper motors using a lower cost BLDC motor for appropriate applications.

Figure 2:
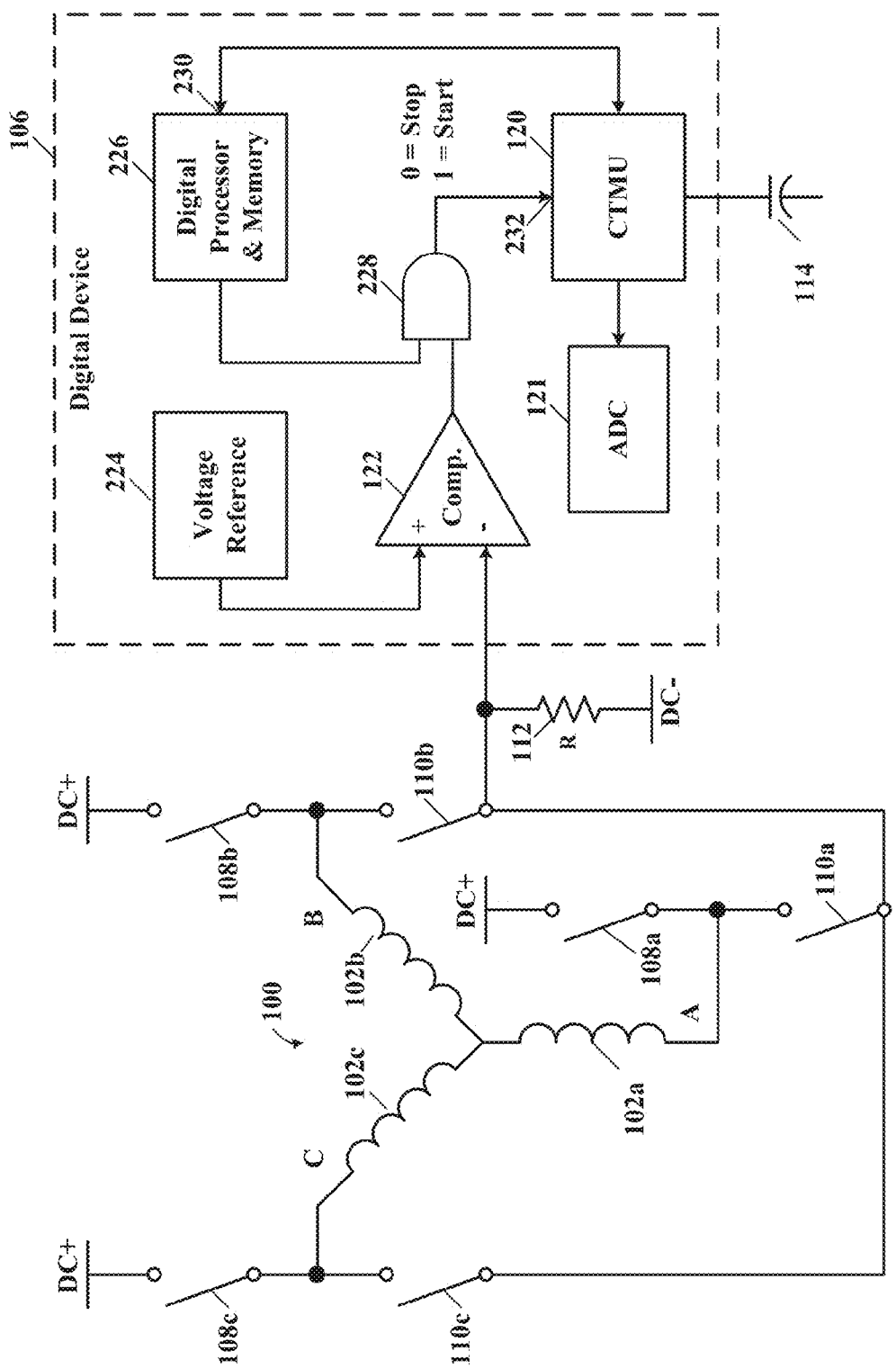
FIG. 2 illustrates a simplified schematic diagram of the three-phase sensorless brushless direct current motor and electronically commutating motor controller shown in FIG. 1, according to a specific example embodiment of this disclosure.

Referring to FIG. 2, depicted is a simplified schematic diagram of the three-phase sensorless brushless direct current motor and electronically commutating motor controller shown in FIG. 1, according to a specific example embodiment of this disclosure. This circuit arrangement may be used for determining the position of a permanent magnet rotor at rest and at low speed without additional hardware or the back EMF zero-cross detectors 104 (FIG. 1). The power transistors 108 and 110 are shown as switches 108 and 110, respectively, for simplification in describing herein circuit operation thereof. The switches 108 couple the motor stator windings 102 to DC+, and the switches 110 couple the motor stator windings 102 to a current sensing device 112, e.g., a resistor (shown for ease of explanation), that completes the winding current path from DC+ to DC−. Current through the current sensing device 112 may create a voltage that is proportional to this current and may be coupled to a first input, e.g., negative input, of the voltage comparator 122. It is contemplated and within the scope of this disclosure that any type of current sensing device may be used, e.g., current transformer and parallel connected resistor, etc., to generate a voltage, besides just a resistor. One having ordinary skill in electronics and power systems design and the benefit of this disclosure could readily select such a current sensing device in combination with a device that may convert the sensed current into a representative voltage.

The digital device 106 may further comprise a voltage reference 224, an AND gate 228 and a digital processor and memory 226. The voltage reference 224 may be coupled to a second input, e.g., positive input, of the voltage comparator 122 and may provide a reference voltage thereto. When the voltage across the current sensing device 112 is less than the reference voltage, the output of the comparator 122 will be at a logic high ("1"). When the voltage across the current sensing device 112 is equal to or greater than the reference voltage, the output of the comparator 122 will be at a logic low ("0"). Thus the CTMU 120 may start timing when both inputs of the AND gate 228 are at logic highs ("1"), and stop timing when the comparator 122 output goes to a logic low ("0"). When the CTMU 120 is enabled in this way a selectable constant current (not shown but integrated within the CTMU 120) is passed into the external capacitor 114 allowing it to be charged at a specific rate according to the requirements of the application. When the charging is terminated the resulting voltage represents the time taken to charge the capacitor 114. This voltage may be converted by the internal ADC 121 for subsequent processing by the digital processor 226.

In this way a very precise time measurement may be performed by the CTMU 120 and ADC 121 that represents the time required to generate a voltage across the current sensing device 112 equal to the reference voltage from the voltage reference 224. In the context of a microcontroller this has advantages over a purely ADC or counter based time measurement which are restricted by their resolution, e.g., small changes in voltages measured over short periods will produce lower resolution results. In particular the CTMU 120 may be started after a measurement pulse has begun which allows for further sensitivity in the resulting measurement, e.g., the deviation in time measurement from one to the next may be amplified by allowing the external capacitor to be charged faster in a reduced time slot. In the context of motor construction and rotor position measurements this would allow variants of designs such as those referred to as "Surface Permanent Magnet (SPM)" to be measured albeit with the inherent reduced stator inductance variation with rotor position by their design. Conversely those referred to as "Interior Permanent Magnet (IPM)" which typically feature salient pole construction produce a wider range of stator inductance variation with rotor position by design and therefore would produce relatively larger signals for rotor position determination. The current through the current sensing device 112 is generated when the switches 108 and 110 are selectively closed under control of the digital processor 226 via the power transistor drivers 118, as more fully described hereinafter.

Figure 9:
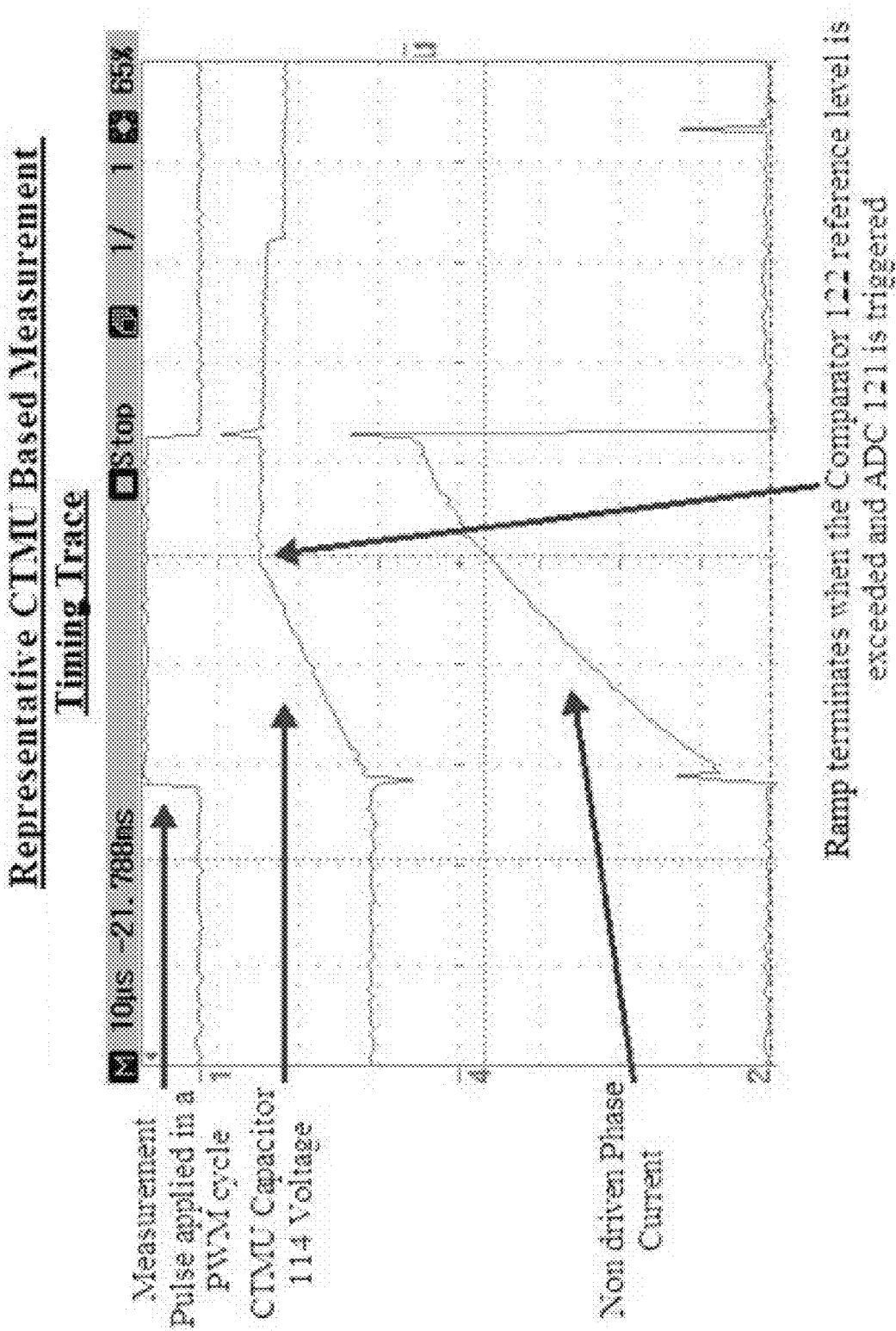
FIG. 9 illustrates a graphical waveform representation of a CTMU based measurement timing trace, according to the teachings of this disclosure.

The CTMU 120 provides precise time measurements that may be started when a logic high ("1") is applied to a control input 232 thereto. When a logic low ("0") is applied to the control input 232 of the CTMU 120 the timing thereof stops. An external timing capacitor 114 may be provided as part of the CTMU 120 timing function. The digital processor 226 may initiate the CTMU 120 timing as well as reset this time, while also controlling operation of the switches 108 and 110, as more fully described hereinafter. A representative CTMU Based measurement timing trace is shown in FIG. 9 for reference purposes. This depicts a measurement pulse applied to the CTMU 120 and motor phase selected for measurement simultaneously. The rise of motor phase current is shown while the pulse is applied and the arising voltage on the CTMU external capacitor 114. In essence the measurement entails the monitoring of the time taken for the Comparator 122 reference level to be exceeded by the converted voltage (representing motor phase current) by the sensing device 112. The resulting voltage on the CTMU capacitor represents this time and is converted by the ADC 121 for subsequent signal processing. It is contemplated and within the scope of this disclosure that various other logic combination for control of the CTMU 120 may be used with equal results. One having ordinary skill in the art of digital circuit design and the benefit of this disclosure could easily come up with alternate designs that would be covered under the spirit and intent of this disclosure.

Figure 2A:
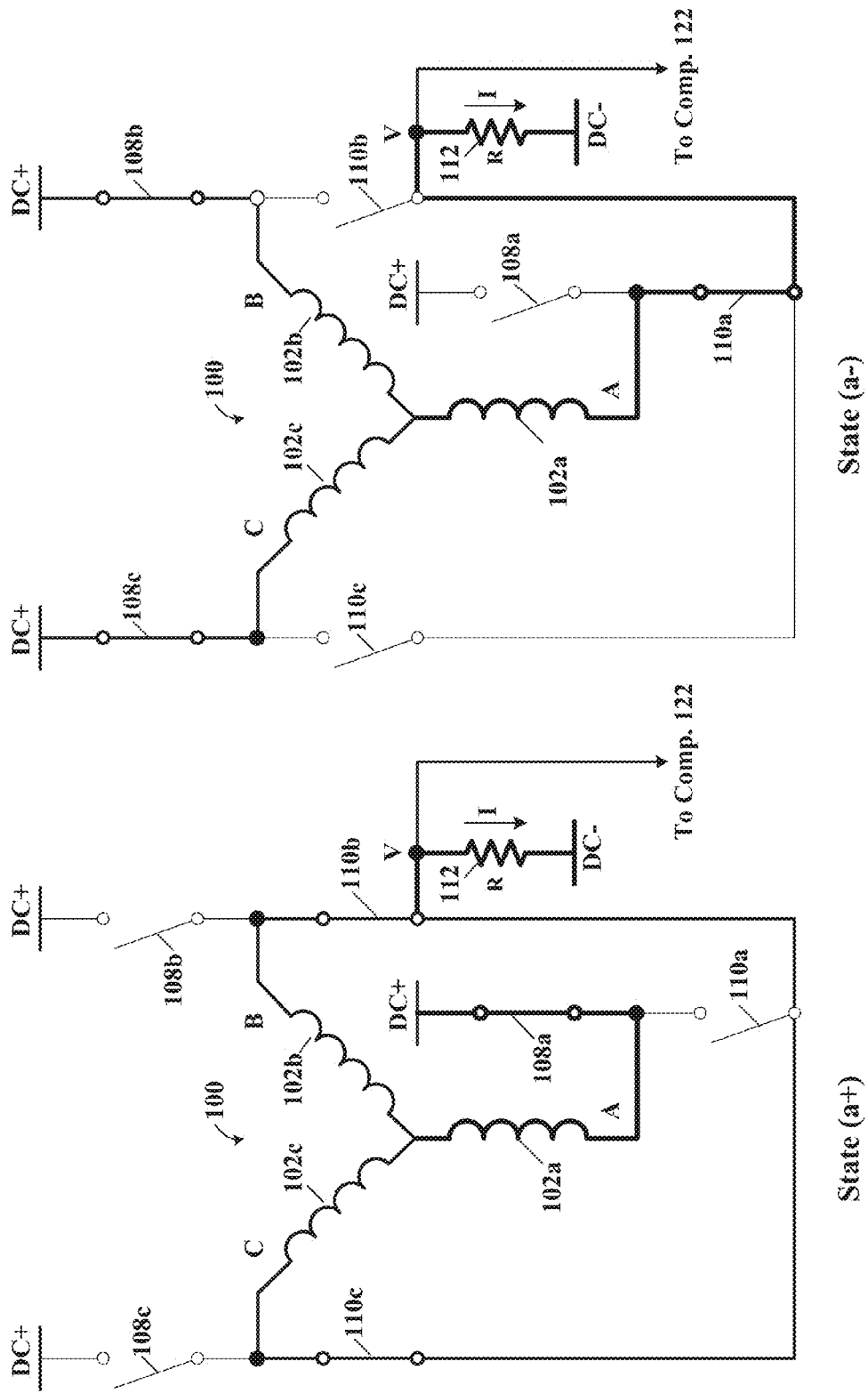
FIG. 2A illustrates a simplified schematic diagram of first and second switch configurations for stator winding excitation to measure inductance thereof in the three-phase sensorless brushless direct current motor shown in FIGS. 1 and 2, according to the teachings of this disclosure.

Referring to FIG. 2A, depicted is a simplified schematic diagram of first and second switch configurations for stator winding excitation to measure inductance thereof in the three-phase sensorless brushless direct current motor shown in FIGS. 1 and 2, according to the teachings of this disclosure. For the first switch configuration hereinafter referred to as "state (a+)" the digital device 106 may close switches 108a, 110b and 110c wherein stator windings 102b and 102c are coupled in parallel and to the low side voltage DC− through the current sensing device 112. This parallel connected combination of stator windings is further coupled in series with the stator winding 102a that is also coupled to the high side voltage DC+. Full current I passes through stator winding 102a and the sum of the currents passing through stator windings 102b and 102c equal current I. Current I also passes through the current sensing device 112 to produce a time dependent voltage V that may be coupled to an input of the voltage comparator 122.

For the second switch configuration hereinafter referred to as "state (a−)" the digital device 106 may close switches 108b, 108c and 110a wherein stator windings 102b and 102c are coupled in parallel and to the high side voltage DC+. This parallel connected combination of stator windings is further coupled in series with the stator winding 102a that is also coupled to the low side voltage DC− through the current sensing device 112. Full current I passes through stator winding 102a and the sum of the currents passing through stator windings 102b and 102c equal current I. Current I also passes through the current sensing device 112 to produce a time dependent voltage V that may be coupled to an input of the voltage comparator 122.

Time varying current through a series connected inductor L and a resistor R, upon application of a direct current (DC) voltage, may be represented by the equation: $I(t)=V/R*(1-e^{-Rt/L})$, where: V is in volts, R is in ohms, L is in Henries, t is in seconds, and e is the base of the natural logarithm. Inductance resists current change according to the aforementioned formula, therefore most of the applied voltage will be directly across the inductor L and very little current will flow through the inductor L and the resistor R at the first instance of voltage applied thereto. As time goes on the current through the inductor L and the resistor R will increase, thereby causing an increase in the voltage across the resistor R, i.e., V=I*R, Ohms Law. The larger the inductance value of the inductor L, the longer in time t will it take for the voltage across the resistor R to increase. The inductor L may be parallel/series connected stator windings 102, and the resistor R may be the current sensing device 112 described hereinabove.

According to the teachings of this disclosure, the CTMU 120 will start timing when a combination of the switches 108 and 110 first close or shortly thereafter, and stop timing when the voltage across the current sensing device 112 is equal to the reference voltage from the voltage reference 224 (FIG. 2). The switches 108 and 110 that are closed may then open when the voltage across the current sensing device 112 is equal to the reference voltage, but is not necessary in determining the inductance value (e.g., during normal motor running commutation operation). Generally the time between closing and opening of the switches 108 and 110 will be very short, thus not producing enough voltage (torque) to move a stationary permanent magnet rotor of the motor 100. This is useful when determining a rotor position at rest and also equally effective when interleaved position measurements are made between PWM power pulses during operation of the motor 100.

Figure 2B:
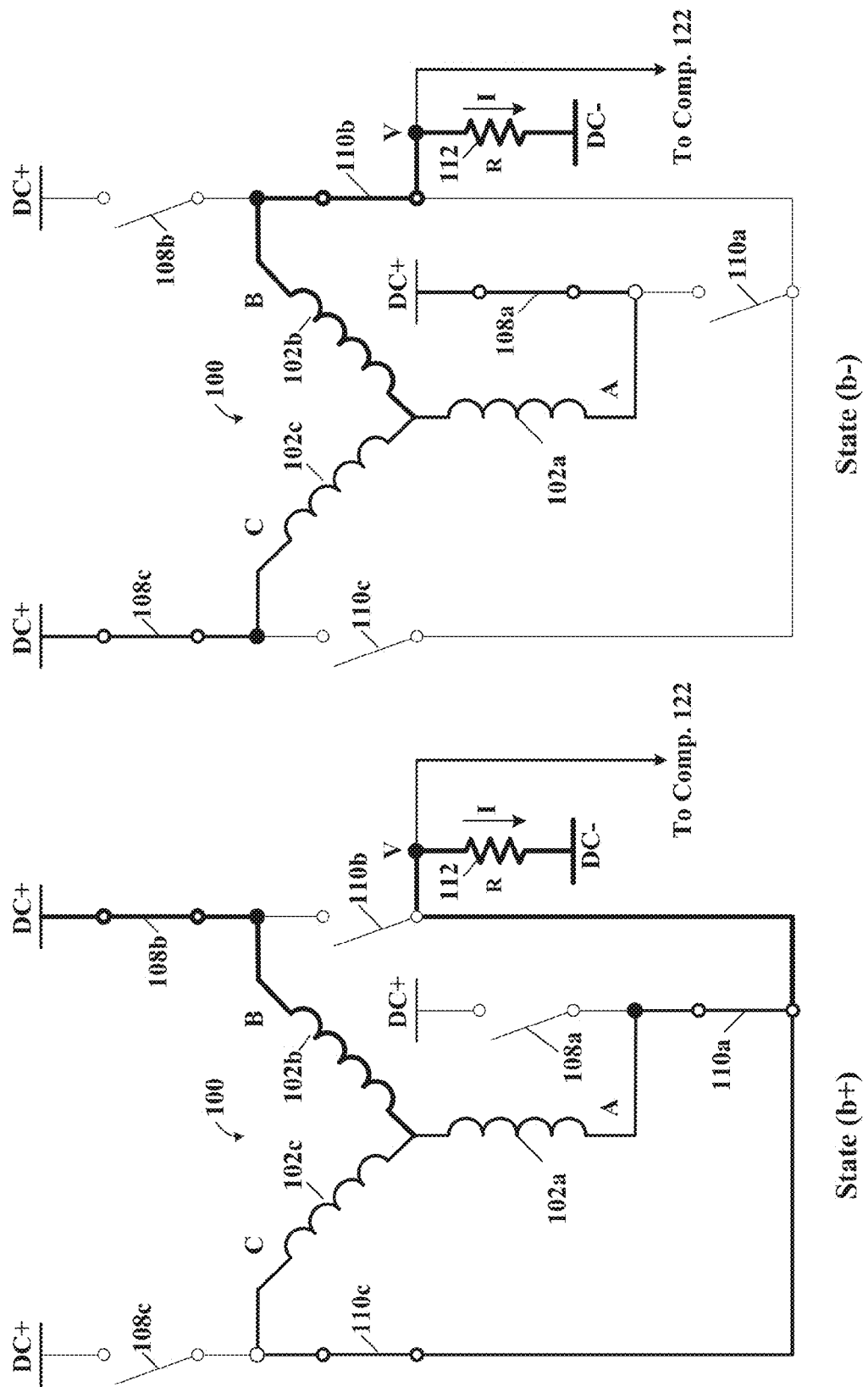
FIG. 2B illustrates a simplified schematic diagram of third and fourth switch configurations for stator winding excitation to measure inductance thereof in the three-phase sensorless brushless direct current motor shown in FIGS. 1 and 2, according to the teachings of this disclosure.

Referring to FIG. 2B, depicted is a simplified schematic diagram of third and fourth switch configurations for stator winding excitation to measure inductance thereof in the three-phase sensorless brushless direct current motor shown in FIGS. 1 and 2, according to the teachings of this disclosure. For the third switch configuration hereinafter referred to as "state (b+)" the digital device 106 may close switches 108b, 110a and 110c wherein stator windings 102a and 102c are coupled in parallel and to the low side voltage DC− through the current sensing device 112. This parallel connected combination of stator windings is further coupled in series with the stator winding 102b that is also coupled to the high side voltage DC+. Full current I passes through stator winding 102b and the sum of the currents passing through stator windings 102a and 102c equal current I. Current I also passes through the current sensing device 112 to produce a time dependent voltage V that may be coupled to an input of the voltage comparator 122.

For the fourth switch configuration hereinafter referred to as "state (b−)" the digital device 106 may close switches 108a, 108c and 110b wherein stator windings 102a and 102c are coupled in parallel and to the high side voltage DC+. This parallel connected combination of stator windings is further coupled in series with the stator winding 102b that is also coupled to the low side voltage DC− through the current sensing device 112. Full current I passes through stator winding 102b and the sum of the currents passing through stator windings 102a and 102c equal current I. Current I also passes through the current sensing device 112 to produce a time dependent voltage V that may be coupled to an input of the voltage comparator 122.

Figure 2C:
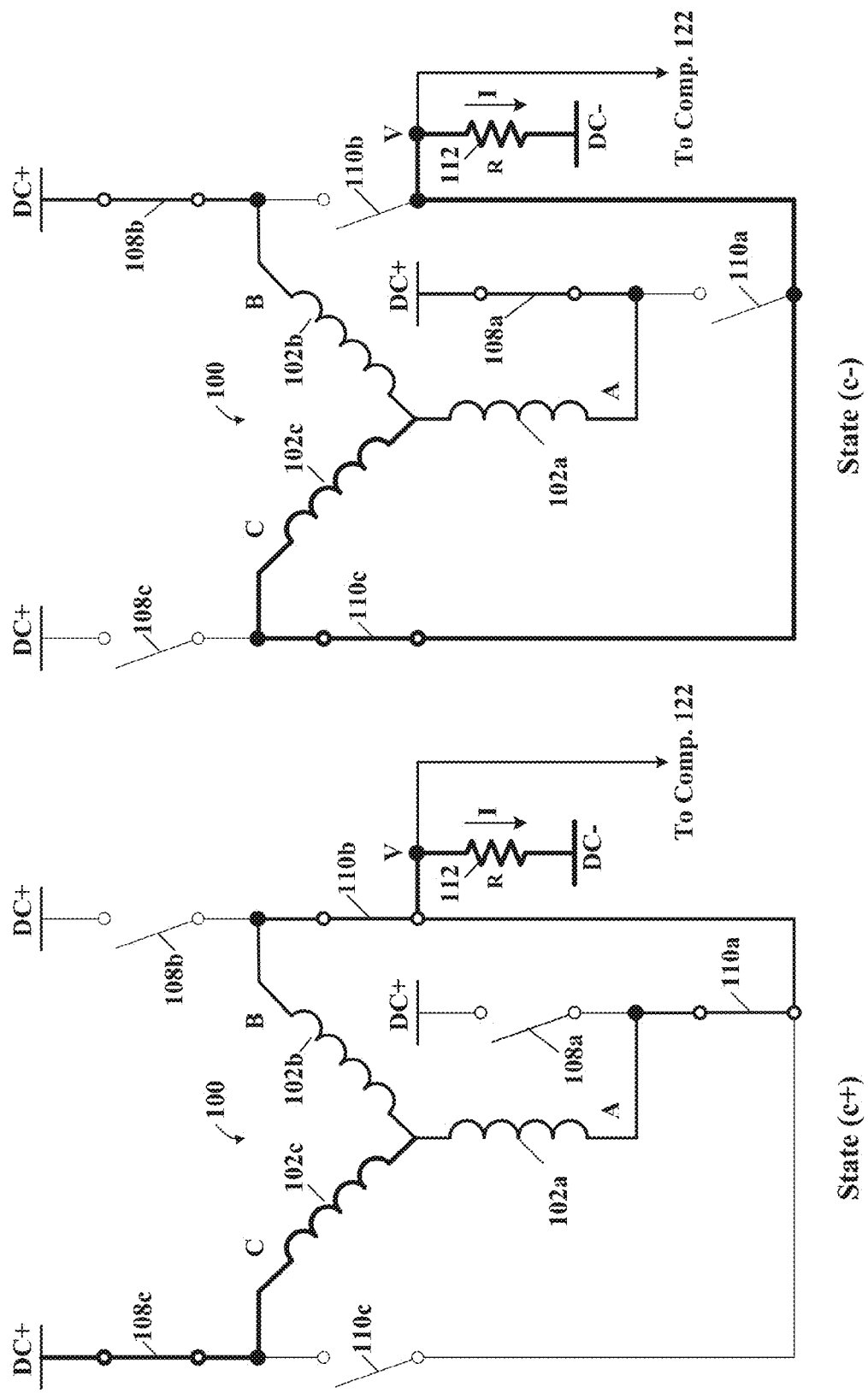
FIG. 2C illustrates a simplified schematic diagram of fifth and sixth switch configurations for stator winding excitation to measure inductance thereof in the three-phase sensorless brushless direct current motor shown in FIGS. 1 and 2, according to the teachings of this disclosure.

Referring to FIG. 2C, depicted is a simplified schematic diagram of fifth and sixth switch configurations for stator winding excitation to measure inductance thereof in the three-phase sensorless brushless direct current motor shown in FIGS. 1 and 2, according to the teachings of this disclosure. For the fifth switch configuration hereinafter referred to as "state (c+)" the digital device 106 may close switches 108c, 110a and 110b wherein stator windings 102a and 102b are coupled in parallel and to the low side voltage DC− through the current sensing device 112. This parallel connected combination of stator windings is further coupled in series with the stator winding 102c that is also coupled to the high side voltage DC+. Full current I passes through stator winding 102c and the sum of the currents passing through stator windings 102a and 102b equal current I. Current I also passes through the current sensing device 112 to produce a time dependent voltage V that may be coupled to an input of the voltage comparator 122.

For the sixth switch configuration hereinafter referred to as "state (c−)" the digital device 106 may close switches 108a, 108b and 110c wherein stator windings 102a and 102b are coupled in parallel and to the high side voltage DC+. This parallel connected combination of stator windings is further coupled in series with the stator winding 102c that is also coupled to the low side voltage DC− through the current sensing device 112. Full current I passes through stator winding 102c and the sum of the currents passing through stator windings 102a and 102b equal current I. Current I also passes through the current sensing device 112 to produce a time dependent voltage V that may be coupled to an input of the voltage comparator 122.

All six of the aforementioned switch configurations are summarized in the following Table I.

TABLE I

| Switch | State (a+) | State (a−) | State (b+) | State (b−) | State (c+) | State (c−) |
|---|---|---|---|---|---|---|
| 108a | ON | OFF | OFF | ON | OFF | ON |
| 108b | OFF | ON | ON | OFF | OFF | ON |
| 108c | OFF | ON | OFF | ON | ON | OFF |
| 110a | OFF | ON | ON | OFF | ON | OFF |
| 110b | ON | OFF | OFF | ON | ON | OFF |
| 110c | ON | OFF | ON | OFF | OFF | ON |

Example time variations, for a small fan motor, in which the voltage across the current sensing device 112 rises to the reference voltage for the various above referenced switch configuration states, as a function of the permanent magnet rotor position within the 60 electrical degree sectors, are summarized in the following Table II. Note that motor construction and also the measurement circuit scaling components will dictate the time which may be optimized for specific requirements, so this is for example only.

TABLE II

| Rotor | Time (a+) | Time (a−) | Time (b+) | Time (b−) | Time (c+) | Time (c−) |
|---|---|---|---|---|---|---|
| 0-60° Sector 1 | 500 μs to 510 μs | 475 μs to 485 μs | 485 μs to 492 μs | 492 μs to 500 μs | 485 μs to 492 μS | 492 μs to 500 μs |
| 60-120° Sector 2 | 492 μs to 500 μs | 485 μs to 492 μs | 492 μs to 500 μs | 485 μs to 492 μs | 475 μs to 485 μS | 500 μs to 510 μs |
| 120-180° Sector 3 | 485 μs to 492 μs | 492 μs to 500 μs | 500 μs to 510 μs | 475 μs to 485 μs | 485 μs to 492 μs | 492 μs to 500 μs |
| 180-240° Sector 4 | 475 μs to 485 μs | 500 μs to 510 μs | 492 μs to 500 μs | 485 μs to 492 μs | 492 μs to 500 μs | 485 μs to 492 μs |
| 240-300° Sector 5 | 485 μs to 492 μs | 492 μs to 500 μs | 485 μs to 492 μs | 492 μs to 500 μs | 500 μs to 510 μs | 475 μs to 485 μs |
| 300-360° Sector 6 | 492 μs to 500 μs | 485 μs to 492 μs | 475 μs to 485 μs | 500 μs to 510 μs | 492 μs to 500 μs | 485 μs to 492 μs |

The aforementioned rotor position determining switch configurations may be applied to a motor at rest or when running at very low rotational speeds. These rotor position determining switch configurations have to be used when rotational power driving pulses are not active, e.g., during PWM power drive off times. However, this first embodiment of rotor position determination may be interleaved with the PWM drive power pulses so long as the PWM drive power pulses are not active (off) at all three of the stator windings. For determining rotor position of a motor at rest or running at very low rotational speeds this limitation is fine, and no additional external switching components are required to implement this way of determining rotor position. However third and fourth embodiments provide for simultaneous rotor position determination in parallel with the PWM power drive, as more fully described hereinafter.

The six time measurements (Ta+, Ta−, Tb+, Tb−, Tc+ and Tc−) may be processed to reveal rotor position by comparing the differences in times taken for the voltage threshold of the comparator to be exceeded, e.g., the voltage across device 112 is equal to the voltage from the voltage reference 224 for each one of these six time measurements (Ta+, Ta−, Tb+, Tb−, Tc+ and Tc−). The rotor magnet alignment with respect to a winding/phase will produce an effective increase in inductance in one direction and the opposite (decrease in inductance) for the reverse current direction. Therefore the orientation of the magnet pole is known in relation to a specific winding/phase to within 180 degrees. However, when all the time measurements are done the position may be resolved to within 60 degrees for the stationary rotor. Compare time values in Table II with sector # columns in Table III below.

As the magnet rotates through 360 electrical degrees, transitions in the relationships of the time measurements from the example entries in Table II are shown below in Table III.

TABLE III

| Phase | Sector 1 | Sector 2 | Sector 3 | Sector 4 | Sector 5 | Sector 6 |
|---|---|---|---|---|---|---|
| A | Ta+ > Ta− | Ta+ > Ta− | Ta+ < Ta− | Ta+ < Ta− | Ta+ < Ta− | Ta+ > Ta− |
| B | Tb+ < Tb− | Tb+ > Tb− | Tb+ > Tb− | Tb+ > Tb− | Tb+ < Tb− | Tb+ < Tb− |
| C | Tc+ < Tc− | Tc+ < Tc− | Tc+ < Tc− | Tc+ > Tc− | Tc+ > Tc− | Tc+ > Tc− |

Phase time measurements may be further represented as "phase time measurement pairs," e.g., Phase A (Ta+, Ta−); Phase B (Tb+, Tb−) and Phase C (Tc+, Tc−). The time difference between phase time measurement pairs may be defined as: Phase A ΔTa=(Ta+)−(Ta−), Phase B ΔTb=(Tb+)−(Tb−) and Phase C ΔTc=(Tc+)−(Tc−). From the example time measurements shown in Table II, the longest time measured is when the rotor magnetic pole, e.g., North Pole, increases the inductance of the closest stator phase winding, and the shortest time measured is when the rotor magnetic pole, e.g., South Pole, decreases the inductance of the closest stator phase winding. The other stator windings not proximate to a magnetic pole of the rotor have measured times between the longest and shortest measured times. Also the largest absolute value ΔT and its sign (+/−) may be used in determining the sector in which the rotor is positioned.

Furthermore, if the rotor is made to rotate by application of an external force like for example wind in blades coupled to a fan/rotor, position may be resolved to a finer resolution and a representative graphical plot is shown in FIG. 5. This representative graphical plot shows the rotor being rotated manually with the measurement process described hereinabove being applied. A variation of this where only Ta+, Tb+ and Tc+ are measured (uni-directional phase current is applied during a CTMU time measurement) and this yields a similar characteristic as shown in FIGS. 6 and 7. The advantage with the former is that taking the difference of Ta+ and Ta−, etc., creates a zero reference when the times are equal and this may mitigate rotating motor effects such as back EMF production while the time measurements ensue.

When the motor is at rest the rotor position may be determined as described above prior to starting/commutating the motor, however this is not mandatory but preferred. For the case where the motor is already being commutated, rotor position determination may use existing methods based on measuring back EMF while a six step commutation is applied. However by also using the second embodiment interleaved with the back EMF measurements, an extended low speed rotor position determination range may be achieved compared to using the back EMF measurement only alternatives (at slow rotational speeds back EMF measurement is ineffective).

Referring back to FIGS. 5, 6 and 7, shown are useable levels of signals with the motor being turned or spun by hand. Hence synchronized commutation with rotor position may be done without sensors from the motor resting position and at low rotational speeds that enables efficient torque to be delivered to the motor (since the correct commutation state may be selected) where the aforementioned alternative methods typically do not provide such information due to the lack of synchronized commutation at start-up and at low speeds.

Third Embodiment

According to a third embodiment, specifically the system is applicable and the method of measurement is done when the motor is being commutated. Hence this method may link with the first embodiment whereby the first embodiment ensures that the rotor position is known prior to starting/commutating the motor, however, this is not mandatory but preferred.

The third embodiment premise of measurement is the same as for existing methods based on measuring back EMF while a six step commutation is applied. That effectively means the non-driven/commutated phase is used for measurement purposes of rotor position. However measurement of motor phase/winding current rise times and hence the inductance change with rotor position leads to an extended low speed range when compared to back EMF measurement only alternatives (at slow rotational speeds back EMF measurement is ineffective).

Continuous commutation of the motor is enabled because measurement is done during the commutation PWM cycle and specifically within, but not restricted to, the low portion thereof (reference FIG. 9). That enables the motor to be operated with more continuous torque than the former embodiment as there is no apparent notion of commutation followed by measurement. The interleaving of measurement pulses in a PWM cycle only limits the maximum percentage duty cycle that may be applied for commutation, e.g., the measurement pulse consumes some of the available duty cycle when applied in a PWM cycle. However, measurement rate is not limited by the commutation PWM frequency and may be different/less, and that leads to reduced effect on motor performance due to measurement pulses being applied to the stator windings. Interleaving of measurement pulses in a typical motor PWM cycle is enabled by the CTMU subsystem as detailed in the General Overview section hereinabove. The sensitized measurements afforded enable the time for measurement to be fitted into a narrow time slot and hence PWM cycle.

This method is different from the first whereby measurement pulses are not applied in one direction followed by the reverse and that affords the ability to integrate the commutation and measurement seamlessly e.g., commutation is not followed by measurement in a sequential manner but rather interleaved and the direction and magnitude of the applied pulse does not conflict with the commutation of the motor.

Figure 3:
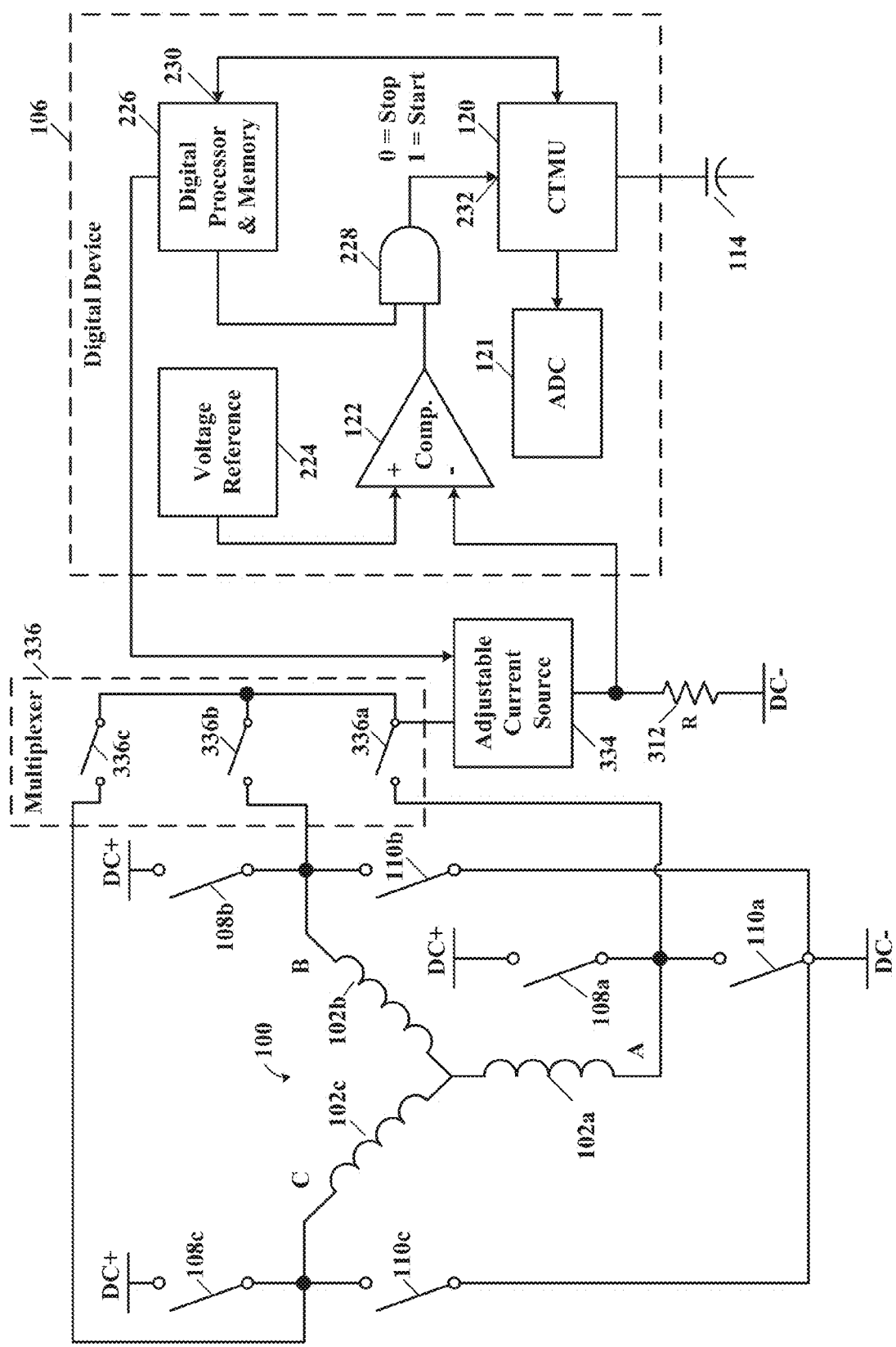
FIG. 3 illustrates a simplified schematic diagram of the three-phase sensorless brushless direct current motor and electronically commutating motor controller shown in FIG. 1, according to another specific example embodiment of this disclosure.

Referring to FIG. 3, depicted is a simplified schematic diagram of the three-phase sensorless brushless direct current motor and electronically commutating motor controller shown in FIG. 1, according to another specific example embodiment of this disclosure. This circuit arrangement may be used for determining the position of a permanent magnet rotor between the times that the PWM power pulses are being applied to two of the three stator windings. The power transistors 108 and 110 are shown as switches 108 and 110, respectively, for simplification in describing herein circuit operation thereof. The switches 108 couple the motor stator windings 102 to DC+, and the switches 110 couple the motor stator windings 102 to DC−. A multiplexer 336 may be added to the switch configuration shown in FIG. 1, and may be used to inject a low value current into a stator winding not being driven (coupled to DC+ and DC−) by the power switches 108 and 110. The source for this measured current may be whichever stator winding is switched to DC+ at that time, and the return for this measured current may be through the winding not being driven (through multiplexer 336) and current sensing device 312, e.g., a resistor (shown for ease of explanation) to DC−. Current through the current sensing device 312 may create a voltage that is proportional to this current and may be coupled to a first input, e.g., negative input, of the voltage comparator 122. It is contemplated and within the scope of this disclosure that any type of current sensing device may be used, e.g., current transformer and parallel connected resistor, etc., to generate a voltage, besides just a resistor. One having ordinary skill in electronics and power systems design and the benefit of this disclosure could readily select such a current sensing device in combination with a device that may convert the sensed current into a representative voltage.

An adjustable current source 334 may be provided to generate a low value current and may be controlled by the digital processor 226. The current value of the adjustable current source 334 may be selected so that the magnitude is low in relation to the commutation power pulse. This is to reduce the effect on the speed of the motor and scale the signal for measurement purposes.

The time it takes for voltage across the current sensing device 312 to reach a reference voltage from the voltage reference 224 may be used in determining the permanent magnet rotor position within any one of the six commutation states in an electrical rotation of the motor 100. The following Table IV summarizes switch configurations for both PWM power drive and rotor position determination for each one of the six commutation states in an electrical rotation of the motor 100, stator field. Preferably, measurements may be done in three out of the six states, e.g., alternate states (60), (180) and (300). This keeps the motor rotating in the desired direction, e.g., say forward/clockwise whereas if we applied the same measurement pulses in the other alternate states (120), (240) and (360) this would tend to reduce the speed of the motor (effectively this would drive the motor in the reverse/anticlockwise direction). This is not beyond doing but is not preferred, though it is contemplated and within the scope of this disclosure.

TABLE IV

| Switch | State (60) | State (120) | State (180) | State (240) | State (300) | State (360) |
|---|---|---|---|---|---|---|
| 108a | ON | ON | OFF | OFF | OFF | OFF |
| 108b | OFF | OFF | ON | ON | OFF | OFF |
| 108c | OFF | OFF | OFF | OFF | ON | ON |
| 110a | OFF | OFF | OFF | ON/OFF | ON/OFF | OFF |
| 110b | ON/OFF | OFF | OFF | OFF | OFF | ON/OFF |
| 110c | OFF | ON/OFF | ON/OFF | OFF | OFF | OFF |
| 336a | OFF | OFF | ON pulse | OFF | OFF | OFF |
| 336b | OFF | OFF | OFF | OFF | ON pulse | OFF |
| 336c | ON pulse | OFF | OFF | OFF | OFF | OFF |

Figure 11:
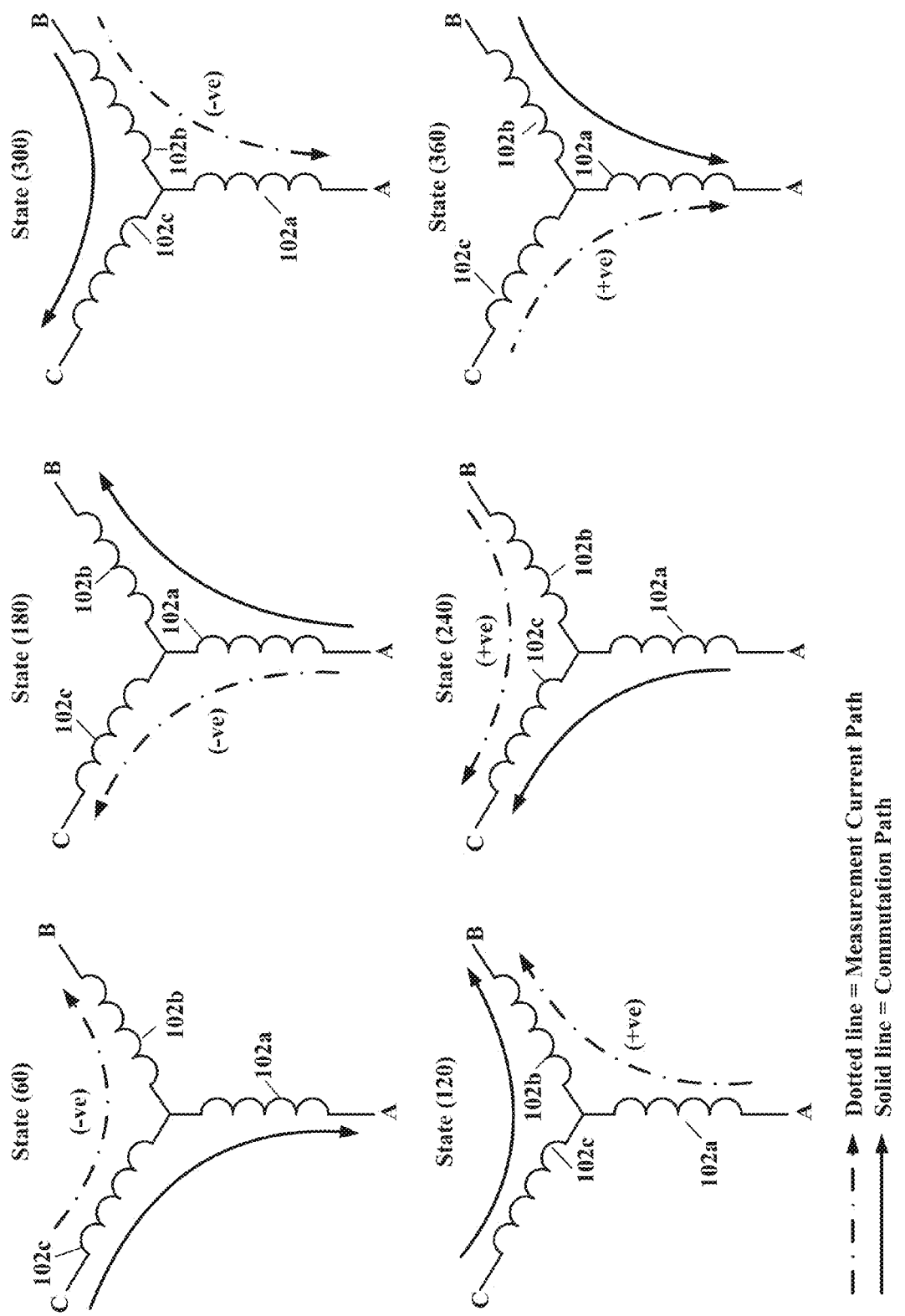
FIG. 11 illustrates simplified schematic diagrams of the measurement and commutation current paths of the three-phase sensorless brushless direct current motor shown in FIGS. 3 and 4, according to the teachings of this disclosure.

It is contemplated and within the scope of this disclosure that the switches 108 and 110 may also be controlled by the PWM generator, the measurement may be done at a particular point in the PWM cycle and at a different rate if required. The low side switches may be modulated when the uni-directional measurement current pulse is interleaved in a PWM cycle (see FIG. 9). This works such that after the ON period of the low side transistors has lapsed the measurement pulse is applied in the remaining part of the PWM cycle. The additional multiplexer 336 performs this measurement current pulse function. Referring to FIG. 11 and FIG. 3 the multiplexer 336 enables current flow in one direction (denoted −ve flow for this direction) for measurement purposes in alternate states (60), (180) and (300). FIG. 11 shows the current path for both commutation and measurement in each of the six states. Basically, selection and retention ON of the appropriate one of the switches 108 may be made to give a measurement current path during the low portion of the PWM drive.

Figure 10:
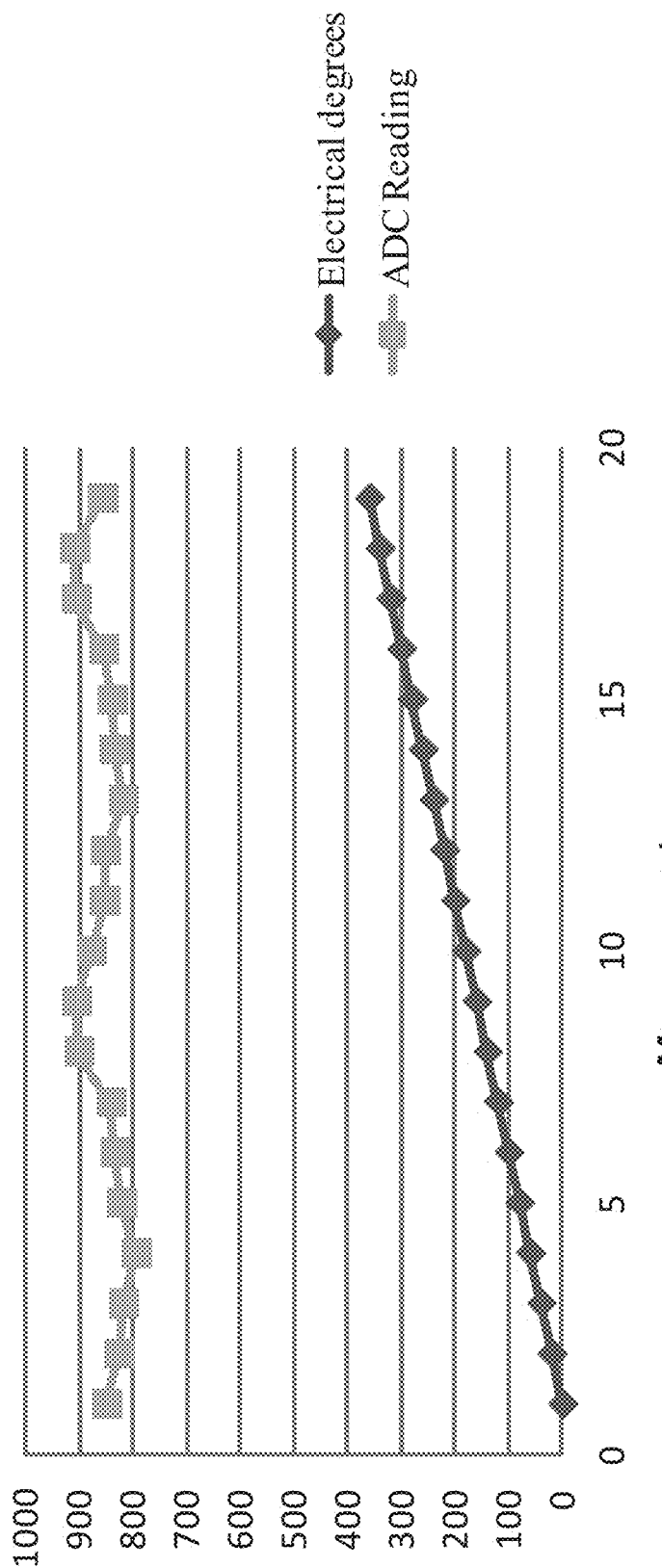
FIG. 10 illustrates graphical waveform and position representations of inductances measured at phase A in relation to electrical degrees of the rotor while the rotor is manually varied, according to the teachings of this disclosure.

Example time variations in which the voltage across the current sensing device 312 rises to the reference voltage for the various above referenced switch configuration states are shown in Table V. This shows the measured charge time variations measured in states (60), (180) and (300) as the permanent magnet rotor is rotated by hand through 360 electrical degrees (effectively through six 60 degree sectors). Referring to FIG. 10, depicted are the graphical waveform and position representations of inductances measured at phase A in relation to electrical degrees of the rotor while the rotor is manually varied, according to the teachings of this disclosure. The graphs shown in FIG. 10 are for the manually rotated rotor (by hand) case and with the measurements taken in state (60) as in Table V below. Note that these are not highly accurate measurements when using only simple equipment to measure the rotation in electrical degrees, e.g., the data was taken with a 10 bit analog-to-digital converter (ADC). If a 12 bit ADC had been used the data resolution would have been four times better.

TABLE V

| Rotor | State (60) | State (120) | State (180) | State (240) | State (300) | State (360) |
|---|---|---|---|---|---|---|
| 0-60° Sector 1 | 25.6 to 27.5 μs | NA | 27.1 to 29.2 μs | NA | 26.4 to 27.6 μs | NA |
| 60-120° Sector 2 | 25.6 to 27.1 μs | NA | 26.4 to 28.3 μs | NA | 27.6 to 29.3 μs | NA |
| 120-180° Sector 3 | 27.1 to 29.2 μs | NA | 26.4 to 27.6 μs | NA | 25.6 to 27.5 μs | NA |
| 180-240° Sector 4 | 26.4 to 28.3 μs | NA | 27.6 to 29.3 μs | NA | 25.6 to 27.1 μs | NA |
| 240-300° Sector 5 | 26.4 to 27.6 μs | NA | 25.6 to 27.5 μs | NA | 27.1 to 29.2 μs | NA |
| 300-360° Sector 6 | 27.6 to 29.3 μs | NA | 25.6 to 27.1 μs | NA | 26.4 to 28.3 μs | NA |

Current through the current sensing device 112 creates a voltage that is proportional to this current and may be coupled to a first input, e.g., negative input, of the voltage comparator 122. Times may be determined with the CTMU 120 as described hereinabove. This embodiment uses current flow in one direction only, uni-directional current flow.

Figure 8:
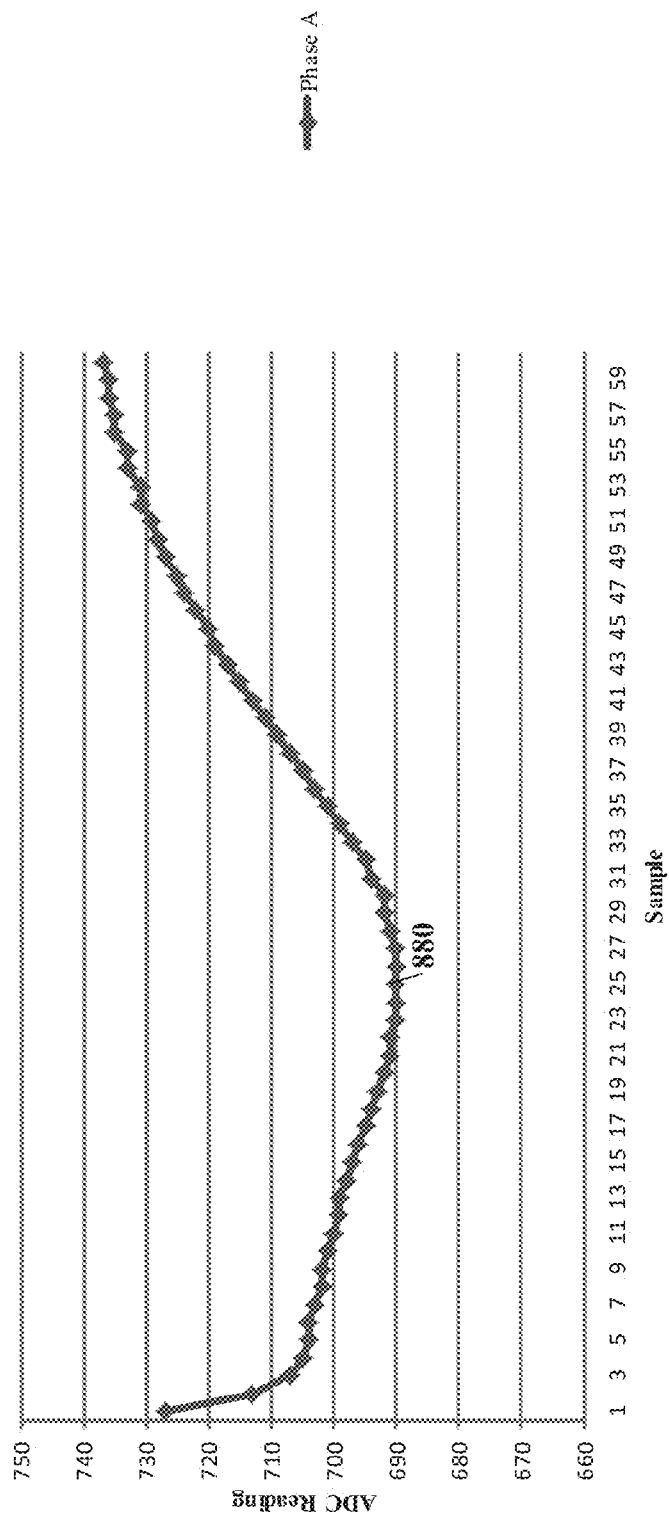
FIG. 8 illustrates a graph of a representative inductance/rotor position variation measured in state (60) while the motor is being commutated and is rotating, according to the teachings of this disclosure.

A representative CTMU based measurement done in state (60), while the motor is rotating and being commutated through all of the six states, is shown in FIG. 8 for reference. The representative measurements shown in FIG. 8 highlight a datum point 880 representing a minima substantially half way through a commutation period when the rotor is aligned in that period. This may be used as a rotor position reference. Hence following measurement of another datum point (not shown) in another state of the six step sequence, the time between the measurements is known and the next commutation in the six step sequence may be scheduled by the microcontroller. The drawback is that measurement may be limited to three out of the six states and synchronizing the rotor to the commutation sequence may be more difficult during startup, but the first embodiment may be effectively used for startup purposes. The representative datum is not restricted to the minima shown and there may be others, e.g., a maxima as dictated by the inductance variation profile with rotor position. For a given motor the datum points established must be known to correlate with rotor position. Note that the data used for the graph shown in FIG. 8 were taken with a 10 bit analog-to-digital converter (ADC). If a 12 bit ADC had been used the data resolution would have been four times better.

For six step sensor-less operation this is what is needed. Timing between two successive datum points gives a rotor speed and positional reference that may be used to schedule the next commutation and at that point transition to synchronised control occurs. Furthermore, additional datum points may be manifest and therefore may be used to ascertain rotor position. Hence signal processing a peak, trough or zero crossing provides the information needed, e.g., a datum, to directly correlate to motor position.

Fourth Embodiment

Figure 4:
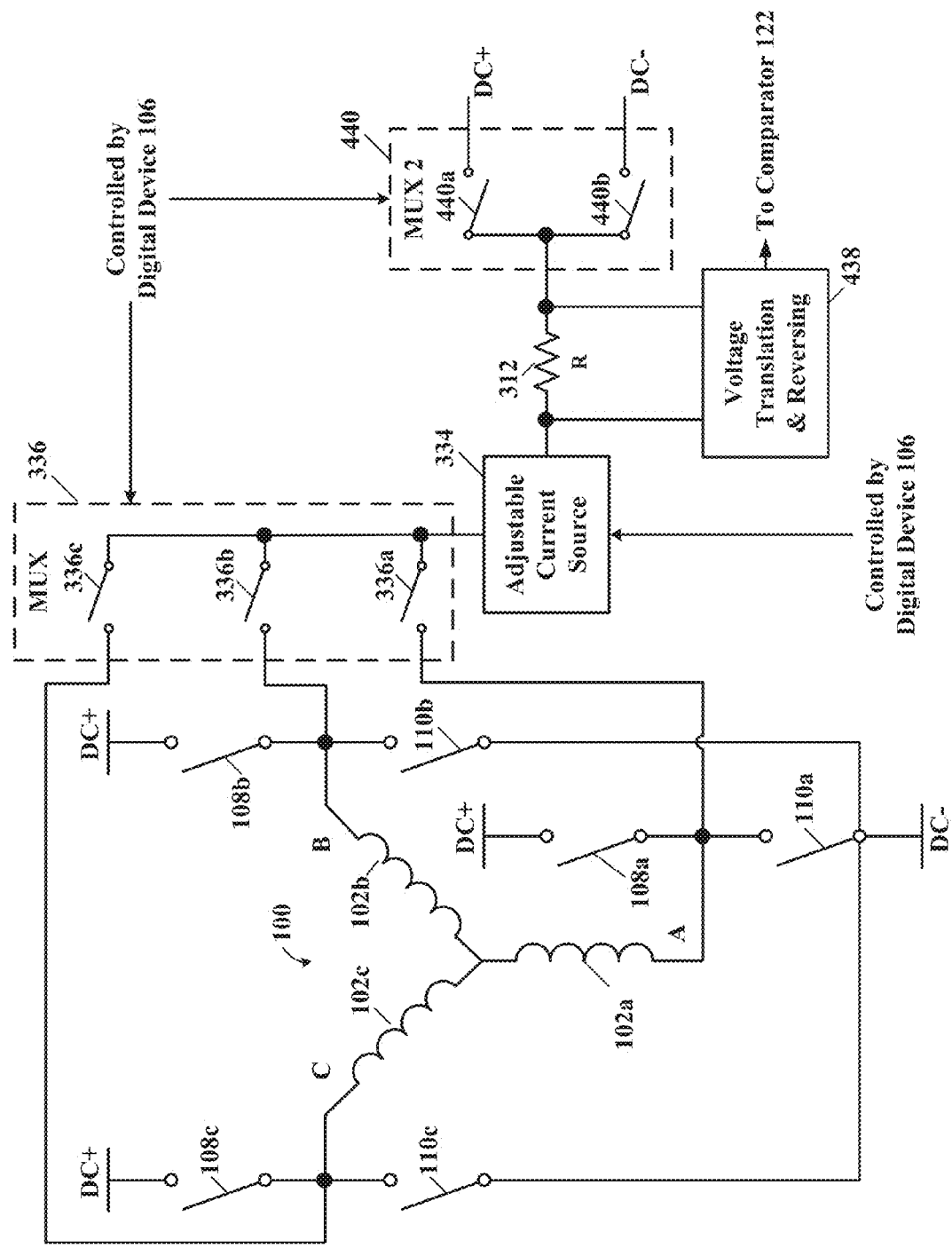
FIG. 4 illustrates a simplified schematic diagram of the three-phase sensorless brushless direct current motor and electronically commutating motor controller shown in FIG. 1, according to yet another specific example embodiment of this disclosure.

According to a fourth embodiment, an extension of the aforementioned third embodiment has specifically added hardware to provide the ability to deliver both +ve and −ve polarity (bi-directional) measurement pulses to the motor phase/windings. Referring to FIG. 4, depicted is a simplified schematic diagram of the three-phase sensorless brushless direct current motor and electronically commutating motor controller shown in FIG. 1, according to yet another specific example embodiment of this disclosure. This circuit arrangement may be used for determining the position of a permanent magnet rotor between the times that the PWM power pulses are being applied to two of the three stator windings. The power transistors 108 and 110 are shown as switches 108 and 110, respectively, for simplification in describing the circuit operation thereof. The switches 108 couple the motor stator windings 102 to DC+, and the switches 110 couple the motor stator windings 102 to DC−. A multiplexer 336 may be added to the switch configuration shown in FIG. 1, and may be used to inject a low value current into a stator winding not being driven (coupled to DC+ or DC−) by the switches 108 and 110. The source or return for the bi-directional measurements may be with the appropriate stator winding switched to DC+ or DC−, and the return or source for the measured current may be through the stator winding not being driven and the current sensing device 312 to DC− or DC+, respectively, through switches 440b or 440a, respectively, of a second multiplexer 440.

The circuit shown in FIG. 4 works in substantially the same manner as the circuit shown in FIG. 3 and described hereinabove with the additional feature of making the unconnected stator winding current/time measurements using both DC+ and DC− reference voltages, e.g., bi-directional current (+ve measurement current flow in addition to the −ve measurement current flow previously mentioned hereinabove for the third embodiment) for time measurements used in determining the rotor position.

The second multiplexer 440 provides the measurement pulse polarity selection for the −ve and +ve current flows. Referring to FIG. 11, +ve measurement current flow may be done in the alternate states (120), (240) and (360), and −ve measurement current flow may be done in the alternate states (60), (180) and (300). Wherein the measurement current path is different to the first pulse and so that the high side switches may be modulated during this PWM cycle. This works such that after the ON period of the high side transistors has lapsed the measurement pulse is applied in the remaining part of the PWM cycle. The additional hardware performs this function with the switches 108 and 110. Hence, +ve and −ve pulses may be applied in alternate states (e.g., commutation periods) and the modulation of the low to high side switches is similarly alternated accordingly in order to complete the current path through the phase/winding being measured.

For the +ve and −ve measurement pulse case, a voltage translation and reversing circuit 438 may be provided so that the voltage polarity to the comparator 122 always remains the same and at the same common potential, e.g., Vss. A simple diode bridge circuit (not shown) may be used to provide the voltage across the current sensing device 312 at the same voltage polarity for either multiplexer switch 440a or 440b configuration, and an isolation circuit, e.g., analog opto-coupler, (not shown) may be used to translate the floating voltage across the current sensing device 312 to a voltage referenced to the common potential of the voltage comparator 122. Since the only voltage of interest from the current sensing device 312 is when it reaches the reference voltage, thereby turning off the CTMU timer, the voltage drop through the voltage reversing diode bridge circuit is of no consequence. It is contemplated and within the scope of this disclosure that other circuit designs may be used equally effectively, and one having ordinary skill in electronic circuit design and the benefit of this disclosure could readily design such circuits.

For a first current direction, switch 440b may close wherein these switch configuration voltage measurements operate substantially the same as the circuit shown in FIG. 3. Example times in which the voltage across the current sensing device 312 rises to the reference voltage for the various above referenced switch configuration states, as a function of the permanent magnet rotor position are summarized in Table V above.

For a second current direction opposite the first current direction, switch 440a may close and the measurement characteristics for those done in the alternate states (120), (240) and (360) are similar to that shown in FIG. 10 and Table V but with different phase.

The current path for the second polarity measurement pulse (+ve) when compared to the third embodiment is different and effectively means its measurement pulse is applied in a different state to that of the first polarity measurement pulse (−ve). Table V shows what happens if we fix states and make measurements during those states while rotating the motor manually. In similar fashion to the third embodiment, the +ve pulse measurements preferably may occur within the alternate states (120), (240) and (360). This keeps the motor rotating in the desired direction, e.g., forward, clockwise, whereas if we applied the same +ve pulses in the other alternate states (60), (180) and (300) this would tend to reduce the speed of the motor (effectively this would to drive the motor backwards, counter clockwise). This is not beyond doing but is not preferred, though it is contemplated and within the scope of this disclosure.

For the +ve current flow during states (120), (240) and (360), the measurement current path is from DC+ through switch 440*a* of the multiplexer 440, the current sensing device 312, the adjustable current source 334, the appropriate switch of the multiplexer 336, and an appropriate one of the low side switches 110 may remain ON. The appropriate one of the high side switches 108 may be modulated ON/OFF wherein the +ve measurement current pulse may be taken during the time that the high side switch 108 is OFF.

For the −ve current flow during states (60), (180) and (300), the measurement current path is from DC+ through an appropriate one of the high side switches 108 remaining ON, the appropriate switch of the multiplexer 336, the adjustable current source 334, the current sensing device 312, and switch 440*b* of the multiplexer 440. The appropriate one of the low side switches 110 may be modulated ON/OFF wherein the −ve measurement current pulse may be taken during the time that the low side switch 110 is OFF.

Utilizing bi-directional current excitation with the multiplexer 440 enables measurements to be done in all six of the states and not conflicting with the commutation current path in each. This provides more regular position monitoring at the six step control method commutation rate. Hence more regular position updates afford more accurate commutation scheduling to be performed by the microcontroller for synchronized (sensor-less) operation. The above embodiment may be linked with the first and third embodiments where the former establishes the rotor position at rest. That enables the next state in the six step sequence to be determined prior to commutation and provides an absolute rotor position within 60 electrical degrees. Therefore the signal processing of measurements may be done in relation to the initial position established (absolute followed by relative measurements). The intent is to provide a quicker transition to sensor-less operation than blindly starting up (commutating) the motor without knowing the position/sector of its rotor at rest.

With the above described third and fourth embodiments, rotor position measurements are taken in combination with motor commutation only. In addition, measurements are tied to the specific state that is being used to commutate the motor. Therefore a rotor position datum point may be established during the measurements performed in each state. For example, FIG. 10 shows that there are peaks and troughs associated with the measured characteristic over 360 electrical degrees and these serve as rotor position reference points that may be detected using signal processing techniques. This is similar to the back EMF zero-crossing detection scenario, and measurements, synchronized to the example motor's Hall sensors, indicate a peak (reference FIG. 8) at substantially half-way through the commutation period when the rotor is aligned and effectively synchronized (alternative motor designs may exhibit different characteristics in this respect).

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for determining a rotor position in a synchronous three phase motor, said method comprising the steps of:
    coupling combinations of two of three stator windings to a first voltage; coupling third one of the three stator windings to a second voltage;
    measuring first times for currents through all combinations of the three stator windings to equal a reference current; and
    determining a rotor position from the measured first times, wherein the rotor position is within an electrical sector associated with a phase time measurement pair having the largest absolute value of a difference there between.

2. The method according to claim 1, further comprising the steps of:
    coupling combinations of the two of the three stator windings to the second voltage;
    coupling the third one of the three stator windings to the first voltage;
    measuring second times for currents through all combinations of the three stator windings to equal the reference current; and
    determining the rotor position from the measured first and second times.

3. The method according to claim 2, wherein the currents are converted to voltages and the measured first and second times are when the converted voltages are equal to a reference voltage.

4. The method according to claim 2, wherein the first and second times are measured with a charge time measurement unit (CTMU).

5. The method according to claim 4, wherein the CTMU generates timing voltages proportional to the measured first and second times.

6. The method according to claim 5, wherein the CTMU generated timing voltages proportional to the first and second measured times are converted to digital representations thereof with an analog-to-digital converter (ADC).

7. The method according to claim 6, wherein the digital representations proportional to the first and second measured times are processed in a digital processor for determining the rotor position.

8. The method according to claim 7, wherein the CTMU, ADC and digital processor are provided in a microcontroller.

9. The method according to claim 2, wherein the first and second times are measured when power pulses are not being coupled to the stator windings.

10. The method according to claim 2, wherein the measured second times are shorter than times that the third ones of the three stator windings are coupled to the first voltage.

11. The method according to claim 1, wherein the electrical sector comprises 60 electrical degrees and is one of six electrical sectors comprising 360 electrical degrees.

12. The method according to claim 1, wherein the synchronous three phase motor is a brushless direct current (BLDC) motor.

13. The method according to claim 1, wherein the synchronous three phase motor is a permanent magnet synchronous motor (PMSM).

14. A method for determining a rotor position in a synchronous multi-phase motor, said method comprising the steps of:
coupling combinations of all but one of a plurality of stator windings to a first voltage;
coupling remaining ones of the plurality stator windings to a second voltage;
measuring first times for currents through all combinations of the plurality stator windings to equal a reference current; and
determining a rotor position from the measured first times, wherein the rotor position is within an electrical sector associated with a phase time measurement pair having the largest absolute value of a difference there between.

15. The method according to claim 14, further comprising the steps of:
coupling combinations of the all but one of the plurality of stator windings to the second voltage;
coupling the remaining ones of the plurality stator windings to the first voltage;
measuring second times for currents through all combinations of the plurality stator windings to equal the reference current; and
determining a rotor position from the measured first and second times.

16. The method according to claim 15, wherein the measured first and second times for each of the remaining ones of the plurality stator windings are phase time measurement pairs.

17. A method for determining a rotor position in a synchronous three phase motor, said method comprising the steps of:
coupling first ones of three stator windings to a first voltage;
coupling second ones of the three stator windings to a second voltage;
injecting first currents from the first voltage into third ones of the three stator windings when the first ones of three stator windings are not coupled to the first voltage and the second ones of the three stator windings remain coupled to the second voltage;
measuring first times for the first currents to equal a reference current; and
determining a rotor position from the measured first times, wherein the rotor position is within an electrical sector associated with a phase time measurement pair having the largest absolute value of a difference there between.

18. The method according to claim 17, further comprising the steps of:
injecting second currents from the second voltage into the third ones of the three stator windings when the second ones of three stator windings are not coupled to the second voltage and the first ones of the three stator windings remain coupled to the first voltage;
measuring second times for the second currents to equal the reference current; and
determining the rotor position from the measured first and second times.

19. The method according to claim 18, wherein the first and second currents are converted to first and second voltages and the measured first and second times are when the converted first and second voltages are equal to a reference voltage.

20. The method according to claim 18, wherein the first and second times are measured with a charge time measurement unit (CTMU).

21. The method according to claim 20, wherein the CTMU generates first and second timing voltages proportional to the first and second measured times, respectively.

22. The method according to claim 21, wherein the CTMU generated first and second timing voltages are converted to digital representations thereof with an analog-to-digital converter (ADC).

23. The method according to claim 22, wherein the digital representations proportional to the measured first and second times are processed in a digital processor for determining the rotor position.

24. The method according to claim 17, wherein the first currents are converted to first voltages and the measured first times are when the converted first voltages are equal to a reference voltage.

25. The method according to claim 17, wherein the first times are measured with a charge time measurement unit (CTMU).

26. The method according to claim 17, wherein the second voltage is more positive than the first voltage.

27. The method according to claim 17, wherein the first voltage is more positive than the second voltage.

28. A system for determining a synchronous motor's rotor position, said system comprising:
a microcontroller comprising a digital processor and memory, a charge time measurement unit (CTMU) coupled to the digital processor, a timing capacitor coupled to the CTMU, an analog-to-digital converter (ADC) coupled to the CTMU, an analog comparator coupled to the CTMU, and a voltage reference coupled to a first input of the analog comparator;
a synchronous motor driven by a power bridge comprising a plurality of power switches for coupling stator windings of the synchronous motor to a power source;
a current return device coupled between some of the power switches and the power source; a second input of the analog comparator coupled to the current return device, wherein the current return device provides a voltage to the second input of the analog comparator proportional to current through the stator windings of the synchronous motor; wherein the digital processor causes the power switches to couple combinations of two of the three stator windings to a first voltage from the power source and third ones of the three stator windings to a second voltage from the power source, and
the CTMU to start charging the timing capacitor; the analog comparator compares the voltage from the current return device for each combination of the three stator windings with a reference voltage from the voltage reference, wherein when the voltage from the current return device is substantially the same as the reference voltage the CTMU stops charging the timing capacitor; and
the ADC converts charge voltages on the timing capacitor to digital representations thereof that are coupled to the digital processor, wherein the digital processor compares these digital representations to determine the rotor position of the synchronous motor, wherein the rotor position is within an electrical sector associated with a phase time measurement pair having the largest absolute value of a difference there between.

29. The system according to claim 28, wherein the charge voltages on the timing capacitor are representative of winding current charging times.

30. A system for determining a synchronous motor's rotor position, said system comprising:
- a microcontroller comprising a digital processor and memory, a charge time measurement unit (CTMU) coupled to the digital processor, a timing capacitor coupled to the CTMU, an analog-to-digital converter (ADC) coupled to the CTMU, an analog comparator coupled to the CTMU, and a voltage reference coupled to a first input of the analog comparator;
- a synchronous motor driven by a power bridge comprising a plurality of power switches for coupling stator windings of the synchronous motor to a power source;
- a multiplexer having outputs coupled to respective ones of the stator windings, and an input coupled to a current source;
- a current return device coupled between the current source and the power source; a second input of the analog comparator coupled to the current return device, wherein the current return device provides a voltage to the second input of the analog comparator proportional to current through the current return device; wherein the digital processor causes the power switches to couple first ones of the stator windings to a first voltage from the power source and second ones of the stator windings to a second voltage from the power source,
- the multiplexer to inject current from the current source into third ones of the stator windings, and
- the CTMU to start charging the timing capacitor; the analog comparator compares the voltage from the current return device for each combination of the three stator windings with a reference voltage from the voltage reference, wherein when the voltage from the current return device is substantially the same as the reference voltage the CTMU stops charging the timing capacitor; and
- the ADC converts charge voltages on the timing capacitor to digital representations thereof that are coupled to the digital processor, wherein the digital processor compares the digital representations to determine the rotor position of the synchronous motor, wherein the rotor position is within an electrical sector associated with a phase time measurement pair having the largest absolute value of a difference there between.

31. The system according to claim 30, wherein the charge voltages on the timing capacitor are representative of winding current charging times.

* * * * *